United States Patent [19]
Ewe et al.

[11] Patent Number: 5,405,182
[45] Date of Patent: Apr. 11, 1995

[54] METHOD AND APPARATUS FOR CONTROLLING A BRAKE VALVE BASED ON SENSED CONDITIONS AND A MODEL OF THE BRAKING SYSTEM

[75] Inventors: Ulrich Ewe, Puchheim; Eckart Saumweber, Gauting, both of Germany

[73] Assignee: Knorr-Bremse AG, Munich, Germany

[21] Appl. No.: 938,270

[22] PCT Filed: Apr. 18, 1991

[86] PCT No.: PCT/DE91/00318

§ 371 Date: Oct. 26, 1992

§ 102(e) Date: Oct. 26, 1992

[87] PCT Pub. No.: WO91/16222

PCT Pub. Date: Oct. 31, 1991

[30] Foreign Application Priority Data

Apr. 26, 1990 [DE] Germany ............... 40 13 278.1

[51] Int. Cl.$^6$ ............................................. B60T 13/66
[52] U.S. Cl. ........................................ 303/15; 303/20; 303/59
[58] Field of Search ............. 303/3, 7, 15, 20, 117.1, 303/70, 33, 59

[56] References Cited

U.S. PATENT DOCUMENTS

| | | | |
|---|---|---|---|
| 4,319,787 | 3/1982 | Wickham | 303/86 |
| 4,538,228 | 8/1985 | Brearey et al. | 303/15 |
| 4,678,241 | 7/1987 | Tamamori et al. | 303/33 |
| 4,859,000 | 8/1989 | Deno et al. | 303/20 |
| 4,904,027 | 2/1990 | Skantar et al. | 303/20 |
| 4,964,679 | 10/1990 | Rath | 303/20 |

FOREIGN PATENT DOCUMENTS

| | | |
|---|---|---|
| 0278928 | 8/1988 | European Pat. Off. |
| 2449574 | 9/1980 | France |
| 2521508 | 8/1983 | France |

Primary Examiner—Matthew C. Graham
Attorney, Agent, or Firm—Pollock, Vande Sande & Priddy

[57] ABSTRACT

The electronic brake control simulates by electronic means various real changes over time of the pneumatic pressures in a braking system, in particular the pressure in the main air pipe of the train, the pressure in the R containers of the individual wagons and the pressure in the individual brake cylinders. When the brakes are released, the values are determined from these model values and the actually backfed air volume, from which values the pilot control pressure for a relay valve can be increased in order to release the brakes more rapidly. The train model determines, by an adaptive learning method at the end of a brake releasing process, values for the volume of the main air pipe and the R containers of the train, so that the train model adapts itself to the actually existing train.

15 Claims, 19 Drawing Sheets

METHOD AND APPARATUS FOR CONTROLLING A BRAKE VALVE BASED ON SENSED CONDITIONS AND A MODEL OF THE BRAKING SYSTEM

FIELD OF THE INVENTION

The invention relates to an adaptive brake control for indirectly acting compressed air brakes with an electropneumatic engineman's brake valve.

BACKGROUND OF THE INVENTION

The U.S. Pat. No. 4,859,000 shows an adaptive brake control with an electropneumatic engineman's brake valve and a relay valve. In the flow connection between the relay valve and a main air pipe (called HL hereinafter) there are three sensors, which measure the flow rate, the absolute pressure and the temperature of the air. Other pressure transducers at the engineman's brake valve measure the pressure of a control pressure container for the relay valve (A pressure) and the pressure in the engineman's brake valve for the requested brake pressure. The output signals of all of these sensors are fed to a microprocessor and evaluated. Primarily the volume of air flowing into the HL by way of the relay valve when the brakes are released or the volume of air flowing out of the HL by way of the relay valve during the braking process is measured.

When a new train is assembled, starting from a totally vented HL, the volume of the supplied air up to the total release of the train is measured and the value is stored. When the HL is later totally vented, a comparison is made as to whether the same volume flowed out. Inversely, it can also be determined later with this comparative value, whether the brakes were completely released. With each braking and releasing manoeuvre, the volume flowing out of the HL during the braking process is always compared with the volume flowing into the HL during the braking process, from which comparative value the changes in the train configuration (e.g. foreseeable closing of a shutoff valve on a wagon) or other failures can be detected. Furthermore, this document deals in detail with the problem of a renewed braking at a time at which the brakes are not yet completely released, thus air is still being backfed into the HL. In such a case the control pressure container (A container) is already filled up to the pressure for the new braking demand signal, whereas the pressure in the HL is still below this value. By braking again in the release phase, the pressure in the A container is reduced relatively rapidly in accordance with the selected brake step. The control valves of the individual wagons respond to the pressure differential between the current pressure in the A container and the HL pipe, a feature that leads to no braking or only to a braking with a smaller brake step than that selected. To solve this problem, in this publication the value of the pressure in the A container is stored at a time at which the flow rate of the backfed air into the HL goes towards zero. At this time the pressures in the A container and the HL are about equal. For the subsequent braking process the value of the pressure in the A container is corrected in accordance with the difference between the closed loop control pressure in the A container and the stored value. For the subsequent braking process one starts then with less A pressure so that the effective pressure drop in the HL that is necessary for the braking process corresponds to the demanded brake step.

This known system assumes that in the individual wagons no air is consumed, rather the volume of air flowing out of the HL during the braking process is always equal to the volume of air required to subsequently totally release said brake. This requirement, however, is not met for brake systems produced in conformity with the UIC standard, since the air flowing during the braking process out of the air supply containers (R containers hereinafter) in the individual wagons to the brake cylinders does not flow back any more into the R containers or the HL when the brakes are released but rather is vented to the open air. Thus, each brake and release cycle results in a consumption of air. This air consumption depends on the length of the train (number of brake cylinders), the chosen brake step, eventual leakiness of the brake system and indirectly also on the weight of the train. Changes in the length of the train by coupling and uncoupling the wagons can only be properly considered, if the train in the new configuration is totally bled (braked) and then released again. In the known system small leaks of HL, which can be accepted in accordance with UIC standard without further ado, would lead to error messages or even to malfunctions.

In the DE journal ETR 37 (1988), issue Jan. 2, pp. 37–43, an electronic brake control for rail vehicles is described, in which control a differential pressure sensor is used to determine the the mass or volume flow of the air flowing into the HL. To release the brakes faster, the HL-pressure setpoint is specifically increased as a function of the preceding braking process, the response time of the valves and the course of the backfeed. The current setpoint of A pressure at the first wagon is the result of the setpoint of the HL pressure corrected by a value that considers the pressure drop between the measuring point and the control valve in the first wagon during the instantaneous rate of air flow in the HL.

A similar engineman's brake valve is described in the EP-A-0.152. 958. There a flow sensor in the form of a differential pressure gauge is provided in the backfeed pipe (HB pipe) and a pressure gauge in the HL. A setpoint signal for the pilot control pressure is corrected on the basis of these measured values, with which the HL pressure can be transformed to the pressure at the first control valve of the first wagon. In this manner the HL pressure is increased as a function of the length of the pipe; and the length of the filling stroke is adjusted to the length of the pipe. This adaptation, however, is still quite inaccurate.

SUMMARY OF THE INVENTION

Therefore, the object of the invention is to improve the engineman's brake valve of the aforementioned kind to the effect that the release times can be further shortened.

The basic principle of the invention is to install by electronic means a "train simulation" that generates from the variables
- of the volume or mass flow of the air backfed into the HL when the brakes are released,
- of the pressure currently measured in the HL and
- of the activation of a brake operating element by the engineer signals, which determine the chronological changes in the pressure increase desired during the brake releasing process. In this electronic train model mathematical curves of the HL pressure and R pressure, and optionally also the C pressure (brake cylinder pressure in the individual brake cylinders), are reproduced or simulated, from which a value is determined that gives the current actual measure for the volume of air still to be refilled into the HL. From this value the actual length of the train (volume of the entire HL pipe of the train and volumes of all R containers) can then be determined through adaptation. Inversely operating states and breakdowns such as leaks, breaking of coupling, emergency braking, faultly closed shutoff valves, etc. can also be determined and can also be differentiated from each other in part.

BRIEF DESCRIPTION OF THE DRAWINGS

The invention is explained in detail with the aid of an embodiment with reference to the drawings in the following.

DESCRIPTION OF PREFERRED EMBODIMENT

Figure 1:
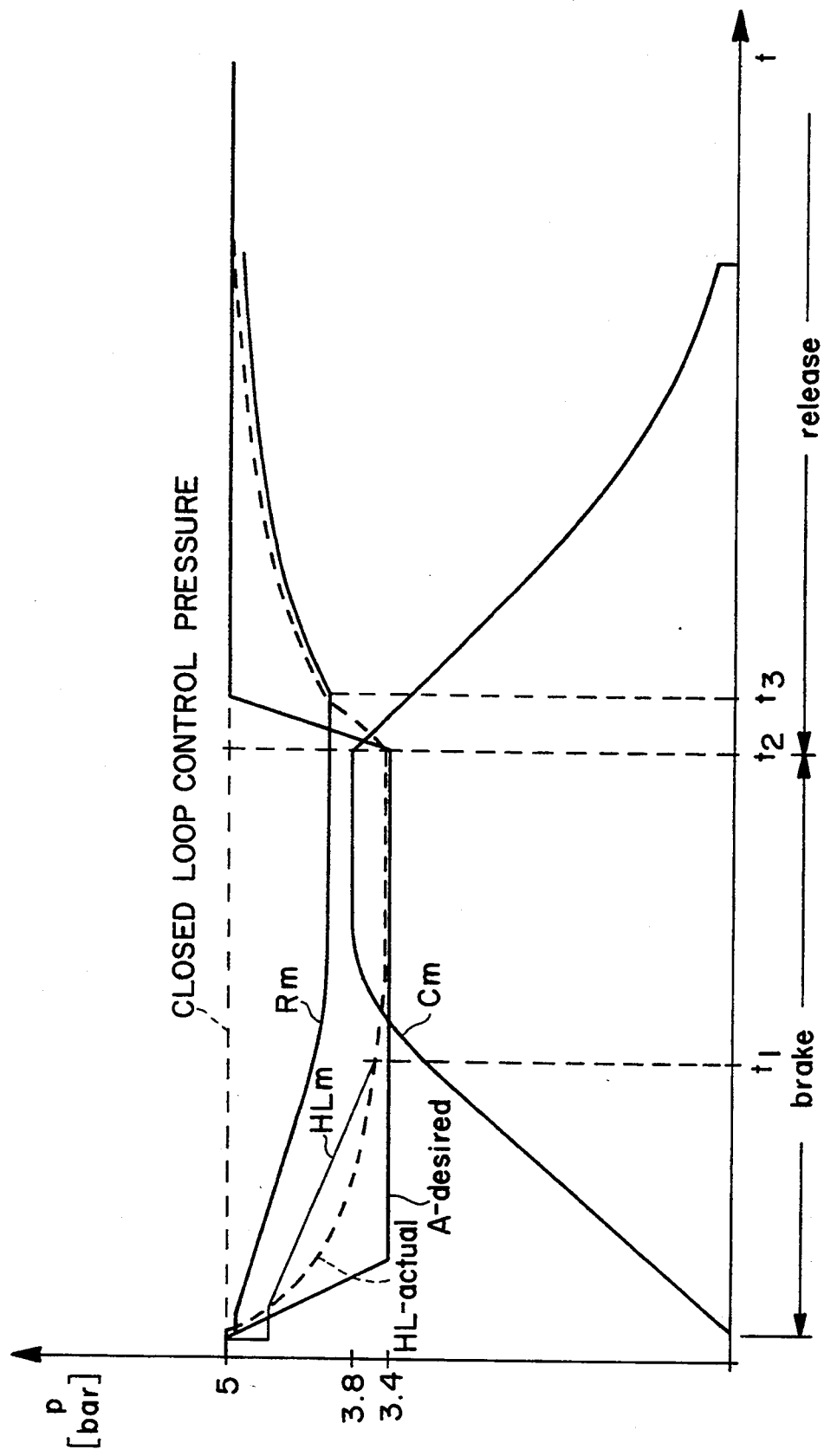
FIG. 1 is a diagram of the characteristics as a function of time of the different actual and simulated pressures of the brake system.

First, the basic operational mode of the electronic "train model" is explained with the aid of the diagram of FIG. 1. The diagram of FIG. 1 shows different characteristics of pressures as a function of time during a braking process. As a function of the actuation of an actuator (e.g. setting and time period of positioning a brake lever or time period of operating a key) a setpoint—A-desired—for the pilot control pressure of the relay valve is formed by electronic means. Individual features of this formation of the setpoint are described in the introductory part of the aforementioned EP-A2-0 152 958. In general this value drops linearly in time during a braking process, starting from a closed loop control pressure of, e.g., 5 bar, until the setpoint of the chosen brake step is reached. Then this value is held constant until another brake step is chosen or the brakes are released.

The pneumatic pilot control pressure is matched with the value A-desired by way of an electropneumatic transformer. Then the relay valve matches with a time delay the HL pressure with the value A-desired.

Braking Process: HL Pressure Decrease, R Pressure Decrease/C Pressure Increase In so doing, the HL pressure drops according to an e function, in accordance with the curve HL-actual of FIG. 1. In the invention the HL pressure is measured by a pressure sensor and as the electric signal HL-actual is made available to the "train model" as the input value. A simulation $HL_m$ of the HL pressure is formed in the train model. Starting from the closed loop control pressure, the value of $HL_m$ is first reduced by a constant value $dHL_1$ in order to simulate a start running behavior. In so doing $dHL_1$ is, for example, 400 mbar. From this value $HL_m$ runs linearly with a gradient (slope) that is inversely proportional to the entire volume of the HL. This volume is divided into blocks of whole numbers in order to simplify the calculation, so that the gradient of $HL_m$ is inversely proportional to the number of HL blocks AH1. This slope constant provides that in the initial phase of the braking process the value of $HL_m$ is greater than the actual value HL-actual. Starting from the intersection of the two curves $HL_m$ and HL-actual, $HL_m$ is corrected by HL-actual, a mathematical procedure effected by maximum inquiry. In addition the minimum value HL-min of $HL_m$ is continuously stored and evaluated by an adaptive learning process at specific points in time.

A desired pressure C-desired for the brake cylinder pressure is determined as a function of the instantaneous HL pressure drop dHL and the maximum possible C pressure C-max, with which in the train model the actual value of the C pressure $C_m$ is matched by way of a timing element. If the R containers are exhausted, $C_m$ is increased up to the maximum possible R pressure R-max, thus achieving a pressure compensation. The following relations apply:

$$dHL = UREFge - HL_m;$$

$$C\text{-desired} = MIN(C\text{-max}, (dHL*3 - 0.4 \text{ bar})).$$

The maximum possible increase gradient for $C_m$ is limited to a constant value of, for example, 0.666 bar/s. Thus, the curve of the simulated C pressure is a function of the increase gradient and the maximum possible pressure R-max in the R containers.

Then the characteristic of the pressure in the R containers is determined from the C pressure curve of the model. Apart from the changes due to wear, the volumes of the brake cylinders and the R containers in an assembled train are in a constant ratio $F_1$ to each other (e.g. factor 5), which can be different depending on the kind of wagons. Correspondingly a C pressure increase $dC_m$ induces a proportional R pressure drop $dR_m$. Therefore, for the R pressure drop no specific time function must be specified, if it is coupled with the C pressure increase. The following relations apply:

$$dR_m = f(dC_m) = dC_m/F_1;$$

$$R_m(\text{new}) = R_m(\text{old}) - dR_m.$$

The minimum attained R pressure R-min is also stored and evaluated by a learning method.

Brake Releasing Process: HL and R Pressure Increase/C Pressure Decrease

In the following a brake releasing process is described following a braking process. Here the following basic considerations apply.

As long as the simulated HL pressure $HL_m$ is below the simulated R pressure $R_m$, the entire volume of air flowing in is exclusively refilled in the HL. Not until the HL pressure $HL_m$ is slightly greater (e.g. 30 mbar) than the R pressure $R_m$, by a specified amount $dR_2$, can the R containers be fed from the HL; and the R pressure $R_m$ is then also dragged along with the HL pressure $HL_m$. (Prerequisite is that the brake pressure demand UREF is greater than the simulated R pressure $R_m$). Starting from this instant, the backfed volume of air is thus divided among the HL and the R containers. With the aid of this criterion one can distinguish whether only the HL or jointly the HL and the R containers are being refilled.

The following values are determined during the brake releasing process:
actually backfed volume of air ($\Sigma V$);
volume of air (VSZUG) still to be backfed, raised by the pressures $HL_m$ and $R_m$ to the demanded setpoint (UREF or UREFge).

When the brakes are released, the pressure increase in the HL is determined in the train model for the refilled volume of air based on the measured value. The HL block length is selected in such a manner that for a pressure increase of $HL_m$ by a specific amount of, e.g., 10 mbar a volume of 1 liter of expanded air is required. Every time the sensor for the differential pressure at the restrictor determines with respect to the volume integration that with the specified number of HL blocks the volume to increase the HL pressure by a specified amount of, e.g., 10 mbar has flowed in, the value of $HL_m$ is increased by this amount. As soon as $HL_m$ has exceeded by $dR_2$ the pressure $R_m$, still stored in the model and the condition UREF $> R_m$ is fulfilled, the R pressure is thus dragged along by the HL pressure, the R pressure in the model is also raised, as a function of the measured volume or mass flow and the number of R containers. Starting from this instant, $HL_m$ and $R_m$ run parallel, offset by $dR_2$, and along a curve, which is flatter on the whole, since at this stage more air is required in order to raise the pressure in the total volume of HL and R containers.

The C pressure in the model is decreased as a function of the time characteristic of C-desired, which is a function of dHL. In so doing, dHL is the difference between the HL pressure prior to the start of the braking process minus the current $HL_m$. Theoretically $C_m$ follows the value C-desired according to an e function in consideration of the operating time of the valves. In the model this e function is simulated by four straight lines.

On the basis of the HL pressure increase $HL_m$ a new brake cylinder desired pressure C-desired is determined. The current brake cylinder pressure $C_m$ is matched—as during the braking process—with the setpoint C-desired by way of a timing element. This timing element approximates the operating time of a brake valve on the individual wagons in one embodiment by four linear straight lines. The operating time indicates the fastest possible change in the brake cylinder pressure. Thus, the C pressure decrease has four different gradients at its disposal, depending on the absolute range in which the value $C_m$ lies. In one embodiment the following gradients are used:

1. $C_m$ gradient=0.311 bar/s, when 3.8 bar $\geq C_m > 2.4$ bar;
2. $C_m$ gradient=0.2 bar/s, when 2.4 bar $\geq C_m > 1.4$ bar;
3. $C_m$ gradient=0.133 bar/s, when 1.4 bar $\geq C_m > 0.7$ bar;
4. $C_m$ gradient=0.1 bar/s, when 0.7 bar $\geq C_m > 0.2$ bar.

If the brake cylinder pressure $C_m$ falls below a specified value (in the example 0.2 bar), the brake is regarded as released and $C_m$ is set to 0.

Volume Integration, Volume to be Backfed

The actual backfed volume of air $\Sigma V$ is determined by the volume integration from the measured value of the flow sensor (differential pressure measurement), which monitors the air that is backfed to the HL. In a concrete embodiment, separate pressure sensors are provided on both sides of a flow restrictor or restrictor. The volume of air (or air-mass flow) that has flowed through can be determined from the difference of the measured values of these two pressure sensors, if the other parameters are known. The volume of expanded air dV that has flowed in per unit of time (time cycle) is a function of this pressure differential and the feed pressure HB from the main container. According to the invention, other known measuring equipment can also be used, with which a volume or mass flow of a flowing gas can be determined. In one embodiment a calibration curve for the difference signal of both pressure sensors is stored in a table, whereby the HB pressure is optionally selected as the parameter. Depending on the expense, several calibration curves for the different HB pressures can also be stored. Then by controlling a time cycle, the measured differential pressure can be directly converted into a volume of expanded air dV that has flowed in.

To determine the volume VSZUG that still needs to be fedback, either the pressure increase of the HL pressure or the pressure increase of the HL pressure in combination with the pressure increase of the R pressure is determined in the electronic train model. With the brake releasing process the A-chamber desired pressure UREF is raised. If it involves a partial brake releasing process, it must be checked whether the new A-chamber desired pressure is above the current R container pressure $R_m$, since only in this case are the R containers vented. If this is not the case, only the HL is filled up. The HL block length or the number of HL blocks AHL is selected in such a manner that for a specific pressure increase (e.g. 10 mbar) a specific volume (e.g. 1 liter) of expanded air per HL block is required. In accordance with the volume ratio of HL block to R block of 1:8, eight times the volume (thus 8 liters) of expanded air is required for a pressure increase of the R containers in a block by the same amount (10 mbar.

The value VSZUG is determined as follows.

If during a brake releasing process the A chamber setpoint (UREF or UREFge) is not increased above the minimum R pressure R-min, only the requisite volume of air is computed for the pressure increase in the HL pipe:

$$VSZUG = (UREF - HL_m) * 3 * AHL.$$

If the A chamber desired pressure is so high that, besides the HL, the R containers are also refilled, the ratio of expanded air that flows into the R containers must be taken into consideration. Then the following applies:

$$VSZUG = [MIN (UREF, UREFge) - HL_m] * 3 * AHL + [MIN (UREF, UREFge) - (R_m + dR_2)] * 24 * AR.$$

(AR is the number of R blocks; $dR_2$ is the pressure differential, by which the HL pressure must be greater than the pressure in the air supply containers, in order to vent the R containers; this value is approximately 30 mbar).

Figure 2:
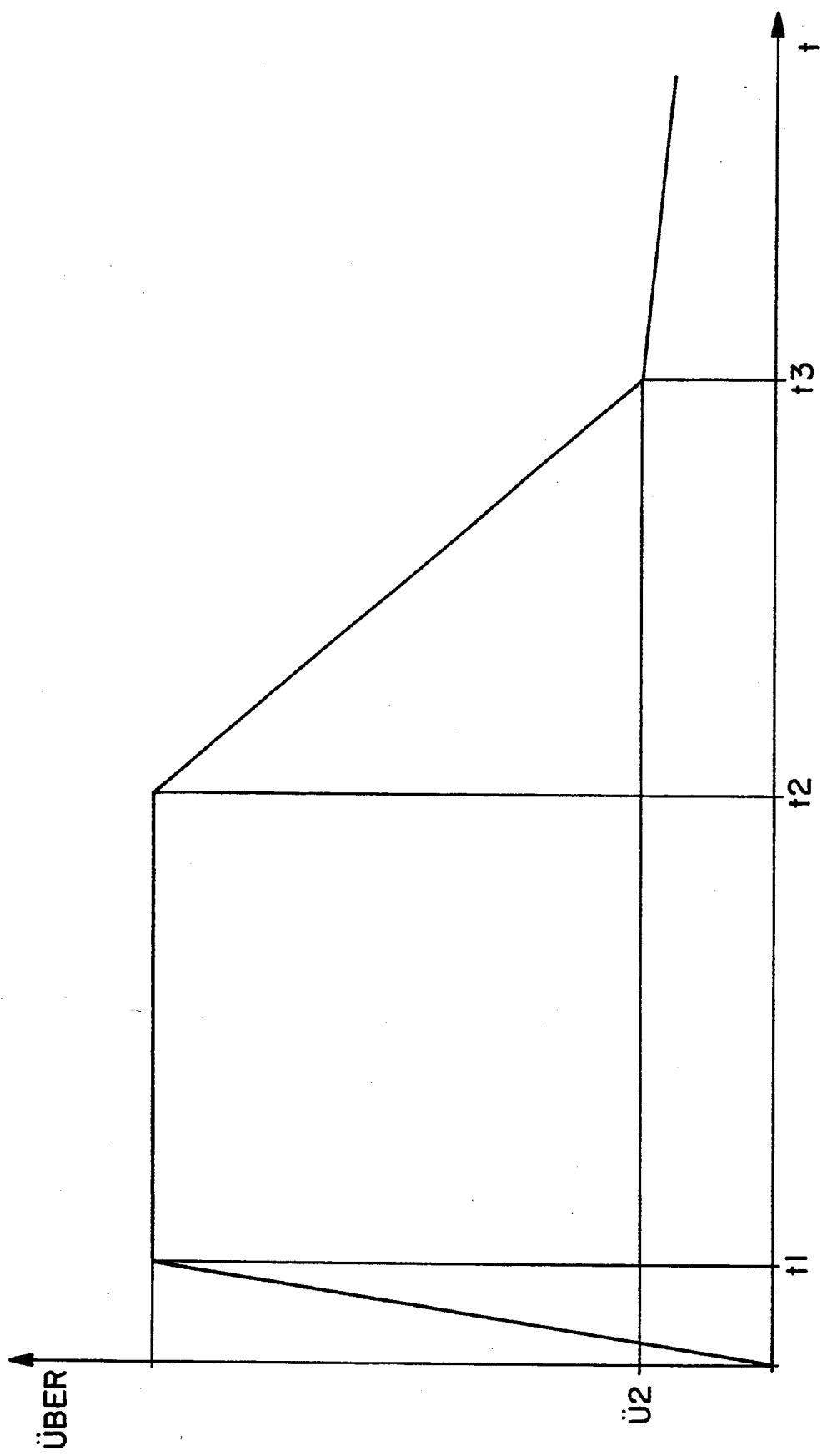
FIG. 2 shows the characteristics as a function of time of the overpressure, which is added to the pilot control pressure during a brake releasing process.
Figure 3:
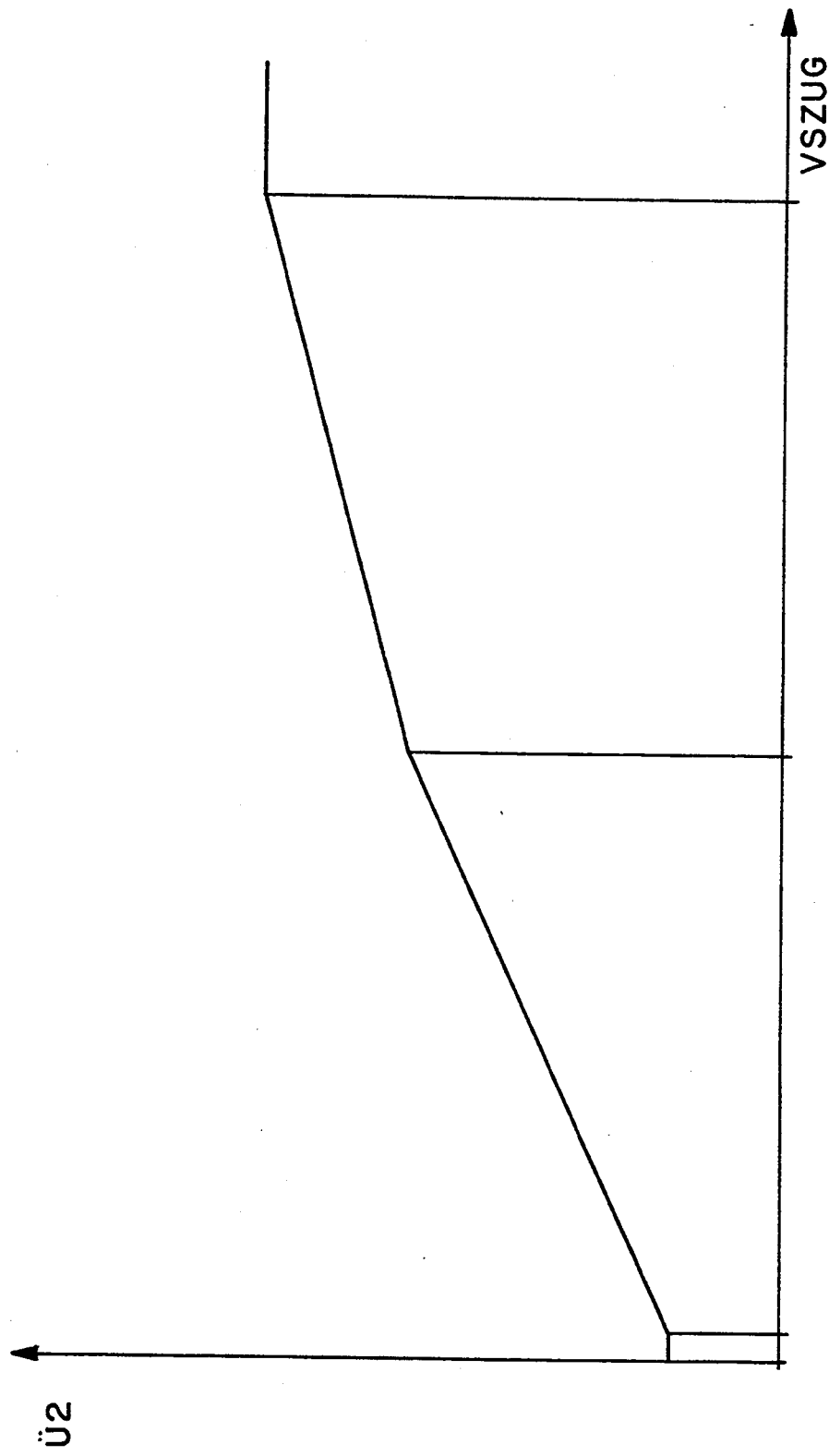
FIG. 3 is a diagram of the dependency of a parameter of the overpressure on the value VSZUG of a volume of air still to be backfed during a brake releasing process.

The overpressure "ÜBER", which is possible during the brake releasing process and is added to the A-chamber desired pressure, is determined from the value VSZUG. FIG. 2 shows the characteristic of the "ÜBER". Two setpoints Ü1 and Ü2 are provided that are connected together by way of a constant factor (e.g. factor 5). The amount of Ü1 or Ü2 is determined from VSZUG. FIG. 3 shows the relationship between Ü2 and VSZUG. If VSZUG is below a threshold, Ü2 is held constant. Starting from this lower limit, Ü2 rises linearly with a first slope up to a second threshold. Starting from a second threshold, Ü2 again rises linearly, but somewhat flatter than in the first region. Above an upper limit, Ü2 is again held constant in order to prevent the front wagons of the train from being overloaded.

The overpressure "ÜBER" actually added to the A-chamber desired pressure is increased up to the value Ü1 with a specified linear increase gradient (e.g. 1.6 bar/s) by way of a timing element only when the brake is completely released and then held constant for a specified period of time $t_{ü}$. When this time has elapsed, ÜBER is decreased from Ü1 to Ü2 by ways of a second timing element. The decrease gradient of this timing element is selected in such a manner that any existing rapid braking accelerators do not respond. The decrease gradient is, for example, 0.333 bar/s. The overage "ÜBER" is led back from Ü2 to zero by way of a third timing element, so that then only the closed loop control pressure remains pending as the A-chamber setpoint. The decrease gradient of the third timing element is adjusted so flat that the brake valves at the individual wagons do not respond. The decrease gradient is, for example, 1 bar per 480 sec.

The time period $t_{ü}$, during which overage Ü1 is pending, is determined in two steps.

The position of the brake lever delivers by way of a stored table an excessive reference time, which matches with a specified gradient by way of a timing element the actual desired excessive time. In order to avoid too high overloadings at the first wagon, the overage Ü1 should not pend the entire time period $t_{ü}$. The required time to decrease from Ü1 to Ü2 is, therefore, taken into partial consideration. To this end the time to increase after Ü1 is measured, this time is multiplied by a constant factor (e.g. factor 2) and the product of $t_{ü}$ is subtracted. Moreover, a check exists that prevents very short trains (e.g. only engine) from being overloaded. In the case of such trains the HL and the R container(s) are filled in a very short period of time upon reaching Ü1; and the measured differential pressure dp goes to zero. To avoid an overloading, the differential pressure is, therefore, compared to a bottom limiting value dp-min1 (of, e.g., 50 mbar). If the differential pressure dp exceeds this threshold for a specific duration (e.g. 1 sec), Ü1 is immediately decreased after Ü2.

Learning Process

According to one aspect of the invention, the values used in the train model for the length of the train (AHL and AR) are determined by a learning method and adapted to the actual conditions. This learning process is conducted following a brake releasing process, when the following conditions are or were fulfilled.

Since the start of the brake releasing process, the determined differential pressure at a flow restrictor must have exceeded a specific threshold (e.g. dp-max=35 mbar) for a specific duration (e.g. one second).

When the brake is totally released, at least the time to reach Ü2+a dead time (of e.g. 2 sec) must have elapsed since the start of the brake releasing process.

The determined differential pressure must have exceeded a specific threshold (dp-min2 of e.g. 20 mbar) for a specific duration (e.g. 1 second).

The first two conditions must be fulfilled chronologically before the third. As soon as the third condition is fulfilled, the learning process is effected.

The learning process is based on a comparison between the volume of air that has actually flowed into the train and the volume of air expected by the model value. The volume of air that has actually flowed in was already used to raise the model pressures of HL and R containers. If the model value is correctly chosen, the HL and R pressures must have reached that value that is specified by UREF or UREFge. If the volume that has actually flowed in and the volume computed by the model deviate, the train is assumed to be longer or shorter than in the model. The values AHL and/or AR must then be corrected.

One measure for the deviation of the train model from the actual train size is VSZUG at the instant of the learning process. VSZUG gives at this instant the volume of air that should still be backfed in order to totally release the train, or with respect to the train model that was too much backfed. By means of the sign of VSZUG it can be determined whether the train model must be enlarged or reduced, whereas the amount of VSZUG gives information relating to the value by which the block numbers AHL and/or AR must be modified. If VSZUG equals zero, model and reality agree completely. The model is thus correct; an adaptive learning process for the model values AHL and/or AR does not have to be conducted. If VSZUG is positive, then the volume of air that has actually flowed in is less than expected. The model is too large and must be reduced.

If VSZUG is negative, then the volume of air that has flowed in is greater than expected. The model is too small and must be enlarged. With HL-min alone or combined with R-min and UREF or UREFge, the air required to release longer or shorter trains can be subsequently computed. In so doing, a value is determined for how many HL and/or R blocks the value of VSZUG existing at the instant of the learning process still suffices or was already too large, in order to adjust the desired pressure.

If during a brake releasing process only the HL was refilled, only the number AHL of the HL blocks may be modified for this new compuation. If, on the other hand, HL and the R containers were refilled, the number AHL and AR can be modified jointly or in specific individual cases only AR. The amount of the modification is based on how many other (or fewer) HL and/or R blocks could have been filled with the value of VSZUG still remaining when the learning process was initialized.

If a big change in the HL or R block number has to be made, a signal is emitted that the engineer must stop. The engineer can consciously react to the changes in the train configuration and also recognizes, for example, whether shutoff valves on the individual wagons were inadvertently closed, resulting in the effective length of the HL being shortened.

In a practical embodiment, the learning process is conducted iteratively with different block numbers. To reduce the computing time, AHL and/or AR are modified in jumps by 0.5 blocks. First, an inquiry was made whether only HL or HL and R blocks were filled. If this inquiry yields that only HL blocks were filled, a check is made as to whether VSZUG is greater or less than zero. If VSZUG is greater than zero, a value $VSZUG_{HL1.5}$ is computed with an HL block number AHL of 1.5, i.e. a value that corresponds to the volume of air to fill 1.5 HL blocks. The block number of the R containers is not modified. If the value VSZUG is greater than $VSZUG_{HL1.5}$, the number of HL blocks is decreased by 2. If VSZUG is less than $VSZUG_{HL1.5}$, another value of VSZUG, namely the value $VSZUG_{HL0.5}$, is computed that corresponds to the volume of air required to fill 0.5 HL blocks. Then a check is made as to whether VSZUG is greater or less than $VSZUG_{HL0.5}$. If this is the case, the number of HL blocks is decreased by 1. If this is not the case, the number of HL blocks is left constant.

If VSZUG is less than zero, the sign is changed in order to simplify the arithmetic for the following calculations. Then the same calculations and checks are carried out as described above. If VSZUG (with the sign changed) is greater than $VSZUG_{HL1.5}$, the number of HL blocks is increased by 2. If this condition is not fulfilled, the comparison with $VSZUG_{HL0.5}$ is made again. If VSZUG is greater than $VSZUG_{HL0.5}$, the number of HL blocks is increased by 1. If this condition is not fulfilled, the number of HL blocks is left constant.

If the check at the start of the learning process yields that the demanded desired pressure UREF was raised over the R pressure $R_m$ existing at the start of the braking process, thus the backfed volume flowed into both HL and into R container, the numbers AHL and AR must be adapted in order to correct the model, provided VSZUG is not equal to zero. If in this case VSZUG is negative, i.e. less than zero, the sign is changed again and a value VSZUG-zug1.5 is computed that corresponds to the volume of air to release each 1.5 HL and R block. Then a comparison is made as to whether VSZUG is greater than VSZUG-zug1.5. If this is the case, AHL and AR are increased by 2. If this is not the case, a value VSZUG-zug0.5 (volume of air for each 0.5 HL and R block) is computed analogously to the above calculations and compared as to whether VSZUG is greater than VSZUG-zug0.5. If this is the case, AHR and AR are increased by 1. If this is not the case, another value $VSZUG_{R0.5}$ is computed, which denotes the volume of air to release 0.5 R blocks. Then a check is made as to whether VSZUG is greater than $VSZUG_{R0.5}$. If this is the case, AR is increased by 1. If this is not the case, all values are left constant.

If VSZUG is greater than zero, the same calculations are conducted in an analogous manner, whereby the values of AHL and/or AR are decreased only in the case of any corrections.

It should also be pointed out that the learning process can be carried out not only for a complete brake releasing process, but also following a partial brake releasing process, during which another brake step is steered into. The partial brake releasing process must naturally be completed, i.e. virtually no air may be backfed any more into the HL, when the learning process is being conducted, a feature that is ensured by the differential pressure measurement and the aforementioned threshold value dp-min2.

To reinitialize the model pressures, it is distinguished whether a complete or partial brake releasing process was conducted.

During a complete brake releasing process the HL pressure in the model is decreased to the closed loop control pressure with the A-chamber desired pressure UREF. The relation applies:

$$HL_m = MAX(UREF - dHL_2, \text{closed loop control pressure}).$$

$dHL_2$ is a pressure differential, which exists when the train is still not completely filled. It amounts, for example, to 20 mbar. The remaining values are set as follows:
HL−min=$HL_m$
R=closed loop control pressure
R−min=$R_m$
$C_m$=0.

The following relations apply for a partial brake releasing process:
$HL_m$=UREF
HL−min=$HL_m$
$C_m$=C−desired=min (C-max, (dHL*3−0.4 bar)).
If the new A−chamber desired pressure is greater than R−min, then
$R_m$=UREF−$dR_2$
R−min=$R_m$ If this is not the case, $R_m$ and R-min remain unchanged.

When the system is turned on, the block numbers AHL and AR are set to a specified value that corresponds to an average mean train length. After a few braking and brake releasing processes or, to be more precise, learning processes, following the brake releasing processes these numbers are than adapted to the actual train length.

According to another aspect to the invention, a breaking of the coupling can also be detected quite accurately. For a reconfigured train, whose precise length is still not known, a very long train is assumed in the model and the time lapse of the actual filling process is compared with a time lapse specified for the complete releasing process of this long train. The measured differential pressure is used as the check value. A starting value DP-kon to monitor the breaking of coupling is recomputed continuously in the braked state. It is a function of HL-min, R-min, and UREFge:

$$DP-kon = [(UREFge - HL\text{-min})*3 + (UREFge - R\text{-min})*24] * 9/256 + 33.$$

This calculation applies to the releasing process of a very long train with a high air requirement. If the learning process advances so far that a more exact statement about the train configuration can be made, AHL and AR are taken into consideration during the calculation of the starting value. Thus the train can be monitored in a more optimal manner. A detection of the breaking of coupling takes place in the released state, as soon as the overpressure "ÜBER" was decreased to Ü2. If this condition is fulfilled, the computed starting value DP-kon is decreased down to a minimum value dp-min3 (e.g. 100 mbar) by way of two timing elements. The decrease gradient is, for example, 150 s/bar, as long as DP-kon is greater than 300 mbar. If DP-kon is between 300 mbar and DP-min3, the gradient is 600 s/bar. The measured differential pressure dp is compared with this detection pressure DP-kon. If the detection pressure for a specific duration is exceeded, a signal "breaking of coupling detected" is emitted.

The bottom limit DP-min3 is chosen in such a manner that the backfeed induced by leaks is not detected as a breaking of coupling. On the other hand, a breaking of coupling, which takes place during closed loop control pressure, is immediately detected.

Another modification of the invention provides a subroutine to check whether after several braking and brake releasing processes, following which the train model adapted itself to the actual length of the train, there are sudden larger changes. In this case an alarm is given to prevent the train model from automatically adapting to the shortening of the train. Such a shortening of the train could also occur due an unintentional shutting off of the HL behind the engine.

Figure 4:
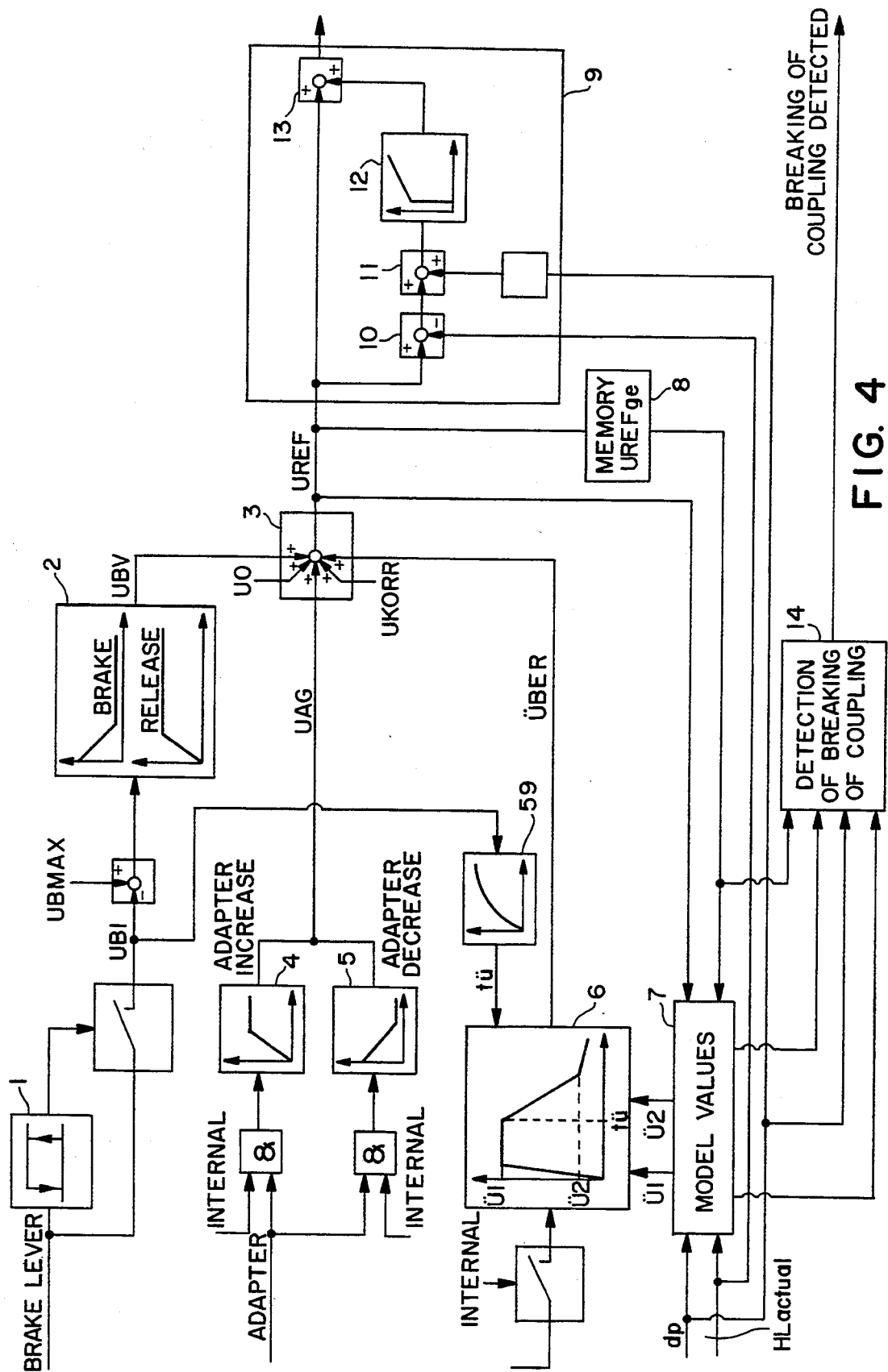
FIG. 4 is a block diagram of a part of the brake control in order to explain the formation of the setpoint for the pilot control pressure (A pressure).

FIG. 4 shows the formation of the A-chamber desired value. The actuation of the actuator, e.g. an engineman's brake lever, is sensed and converted, according to the EP-A-0.152. 958, by means of a simulation 1 of a start running behavior and by means of timing elements 2, which define the gradients or the steepness of a signal change, to a first value UBV, which is fed to an adder 3. The through-connected brake lever value UB1 is converted into the desired excessive time $t_{ü}$ by way of a (stored) table and a timing element (59??).

To simulate the function of an adapter, several components 4, 5—as also known from the EP-A-0.152.958—are provided that feed an adapter value UAG to the adder 3. Specific correction values U-korr and $U_0$, the details of which are of no interest here, are also fed to the adder 3. Finally an overage value "ÜBER", which is formed from the electronic train model 7 in a function block 6, is fed to the adder 3. Other output variables of the electronic train model are used to detect the breaking of coupling (14). The output signal UREF of the adder 3 is a measure for the request for the pilot control pressure and thus the HL pressure. The value of UREF pending at the start of a braking process is stored as UREFge in a memory 8. The value UREF is processed in a controller 9 into a setpoint U-desired, which is fed to an analog transducer, which adjusts by driving the valves the A pressure (pilot control pressure), which is fed to the relay valve of the brake system. The controller contains a comparator 10, which subtracts a signal, which corresponds to the measured HL pressure, from UREF. The output signal of the subtractor 10 is fed to an adder 11, in which a differential pressure value, multiplied by a factor K1, is added. The pressure differential dp is measured by two pressure sensors on both sides of a flow restrictor in the backfeed branch for the HL. Thus, the value dp is a measure for the flow rate of the backfed air. The output of the adder is fed to the actual controller 12, which has here a PI characteristic (proportional-integral). The output of the controller 12 is fed to an adder 13 and added to the value UREF, whereby the sum is then the setpoint U-desired for the analog transducer.

Figure 5:
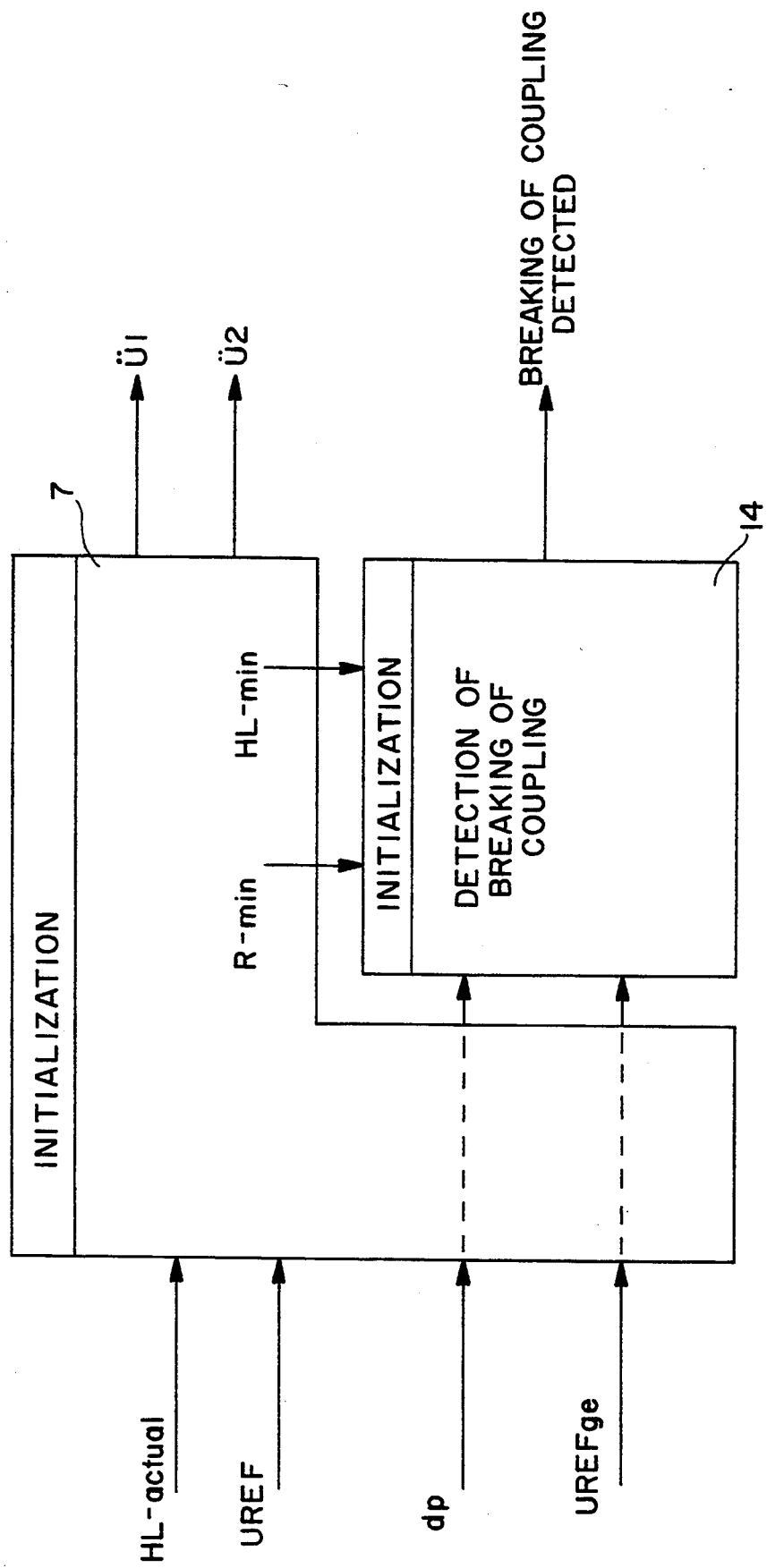
FIG. 5 is a block diagram of the brake control in order to explain the input and output values of the electronic train model.

FIG. 5 illustrates the input and output variables for the train model 7 and the detection of the breaking of coupling 14. Input variables are the measured values of the HL pressure and of the aforementioned differential pressure dp. Other input variables are the values UREF and UREFge.

In the train model 7, desired values Ü1 and Ü2 for the overpressure during the brake releasing process are formed from these four input variables. The actual overage value "ÜBER" is then formed from the variables Ü1 and Ü2 in block 6 of FIG. 4. Other output values of the train model 7 are HL-min and R-min, which are fed together with the measured value dp and the value UREFge to a controller 14 to monitor the breaking of coupling. The values HL-min and R-min are the values of the HL and R pressure determined by the train model and from which the brake releasing process was started.

Figure 6:
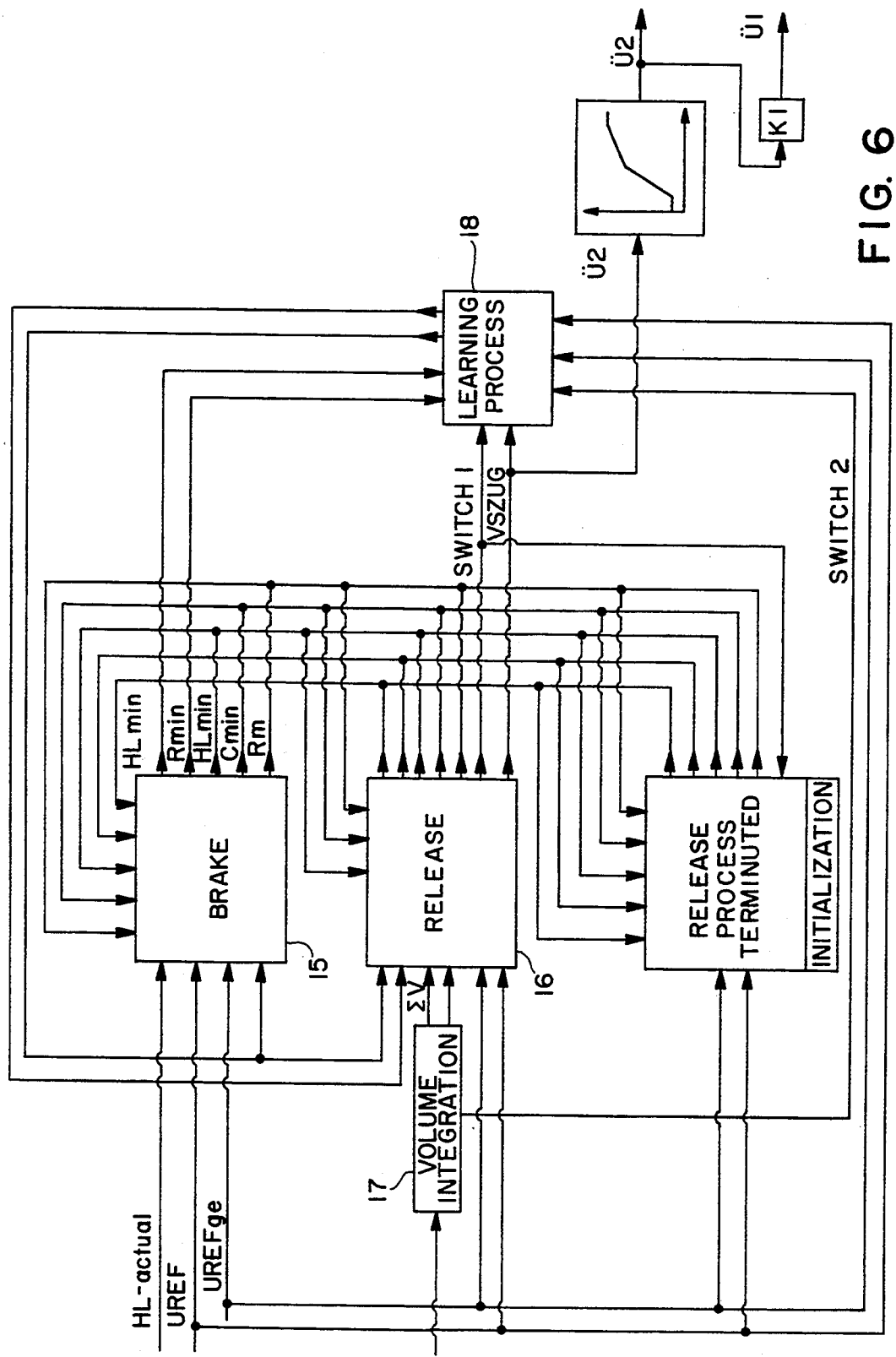
FIG. 6 is a detailed block diagram of the train model.

FIG. 6 is a detailed block diagram of the train model 7 of FIG. 5. As explained in more detail in connection with FIG. 1, the train model simulates substantially three pressures and in particular the HL pressure $HL_m$, the R container pressure $R_m$ and the brake cylinder pressure $C_m$. Since these simulations are formed differently during the braking and brake releasing process, different blocks 15 and 16 are shown in the block diagram. Block 15 forms from the external input variables HL-actual, UREFge and UREF and the internal variable AHL the model variables $HL_m$, $R_m$, $C_m$ and the variables HL-min and R-min.

To simulate the corresponding pressure values during the brake releasing process, the sum ZV of the volume, which has been backfed since the start of the brake releasing process, and a value dV of the volume, which is backfed instantaneously per unit of time, are determined from the measured value dp by way of a volume integration 17 and is fed to block 16. In addition, the internal variables AR and AHL are taken into consideration. On the one hand, the value VSZUG, required for the adaptive learning process and which denotes the air requirement that is still required for the current brake releasing process, and the overage values Ü1 and Ü2, are formed.

In a block 18 for the learning process the number of HL and R blocks AHL or AR is determined from VSZUG, UREF and UREFge and HL-min or HL-min and R-min, when a signal (from the volume integration 17) is given.

Figure 7:
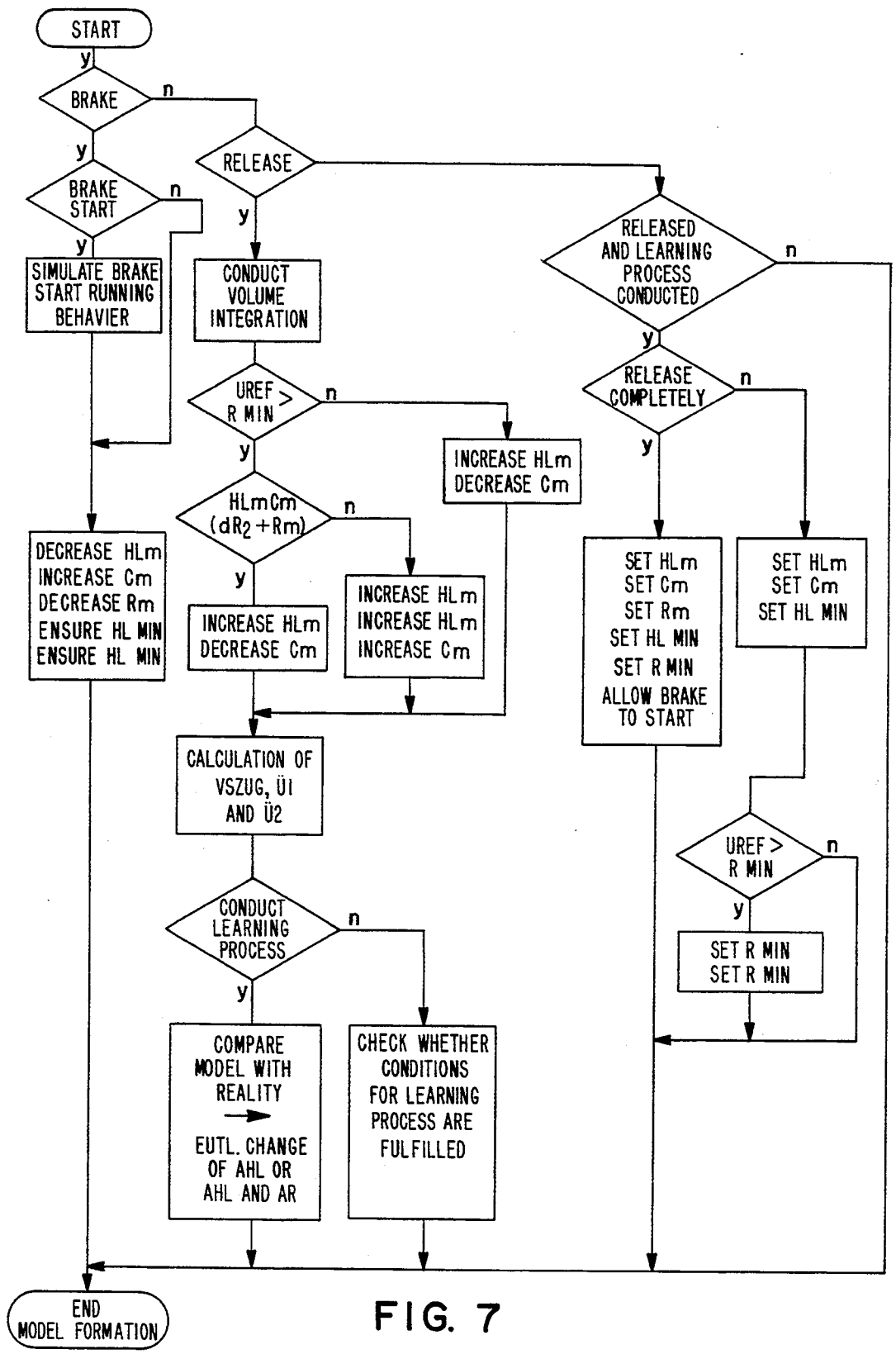
FIG. 7 is a simplified structure of a flow diagram in order to explain the operational mode of the block diagram of FIG. 6.

The flow diagram of FIG. 7 shows the individual checks and working steps. Further explanation to this end is not mandatory.

Figure 8:
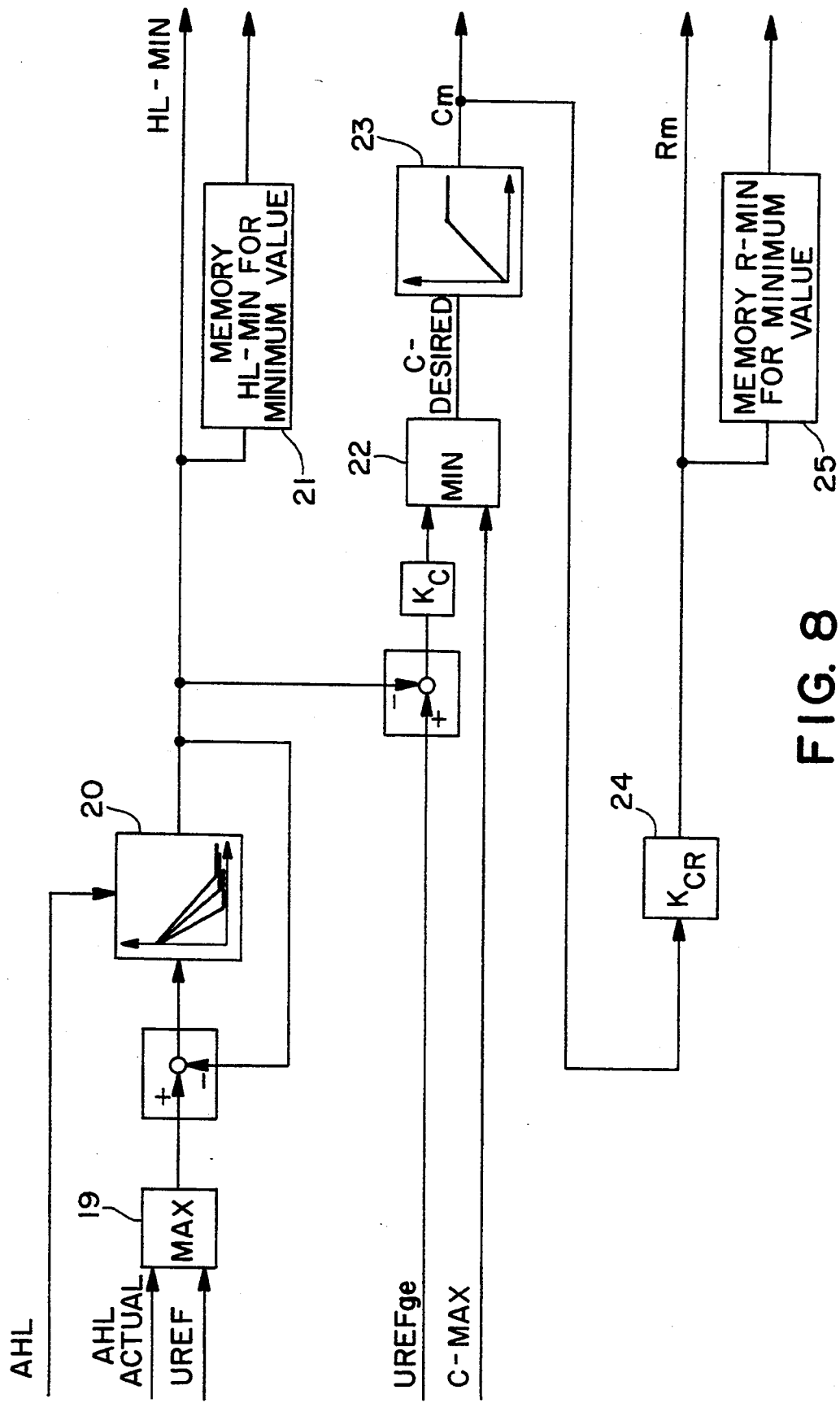
FIG. 8 is a detailed block diagram of those parts of the train model in which specific pressure changes are reproduced.

FIG. 8 is a detailed simulation of the model variables during the braking process. The measured value HL-actual and the desired variable UREF are fed to the maximum value selection 19, in order to form the intermediate value. This intermediate value is matched linearly in time with $HL_m$ in a block 20, whereby the gradient depends on the stored number of HL blocks AHL. The output of block 20 is the model variable $HL_m$. In an additional memory 21 the minimum value of $HL_m$ is stored.

To simulate the C pressure the difference between UREFge and $HL_m$ is formed and multiplied by a factor Kc. In a minimum selection 22 this multiplied differential value is compared with the maximum C pressure C-max, where the minimum value then denotes the desired pressure C-desired of the train model. $C_m$ is formed from C-desired by way of a timing element 23 with specified gradient, where $C_m$ may not be greater than $R_m$, since then the pressure compensation is reached. The value $R_m$ is formed from $C_m$ by way of a multiplication with a constant factor (e.g. factor 5) in a multiplier 24. The current minimum value of $R_m$ is stored in another memory 25. When combined, the blocks shown in FIG. 8 correspond to block 15 of FIG. 6.

Figure 8A:
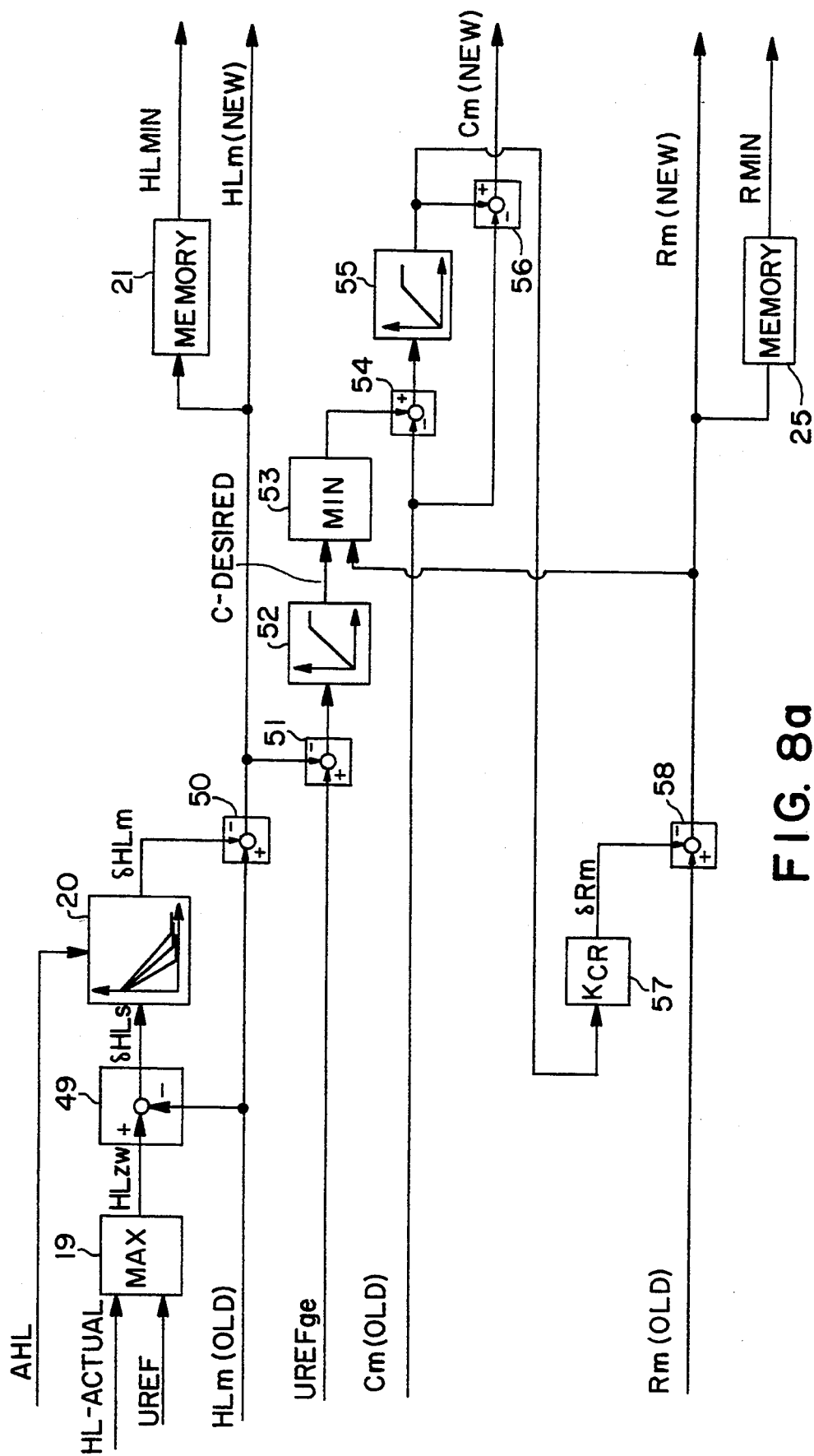
FIG. 8a is a block diagram similar to FIG. 8 of those parts of the train model in which specific pressure changes are reproduced according to a modification of the invention.

FIG. 8a is a detailed simulation of the model variables during the braking process. The measured value HL-actual and the desired variable UREF are fed—as in FIG. 8—to the maximum value selection 19 to form the intermediate value $HL_{zw}$. In a subtractor 49 the value $HL_m$(old) pending from the preceding time cycle is subtracted from the intermediate value, forming a value $\delta HL_s$. In block 20 this value $\delta HL_s$ is enlarged linearly in time, whereby the number of HL blocks AHL serves as the parameter. At the output of the block there appears then a value $\delta HL_m$, which is a measure for the amount by which the $HL_m$ pending for the preceding time cycle must be decreased, in order to obtain a new value $HL_m$(new). Therefore, value $\delta HL_m$ is subtracted from $HL_m$(old) in a subtractor 50. The output of the subtractor 50 makes the value $HL_m$(new) available.

In another subtractor 51 the output of the subtractor 50 is subtracted from the stored value of the brake requirement UREFge, whereby this difference UREFge minus $HL_m$(new) is increased in a block 52 linearly in time with a specified slope, but with a limit to the maximum value C-max. The output of the block 52 denotes the signal C-desire, which is fed to a minimum value selection circuit 53. The circuit 53 selects the minimum of C-desired and $R_m$(new) and passes this on to a subtractor 54, where the value $C_m$ (old) is subtracted. This difference is increased linearly in time in another circuit 55, in order to form a value $\delta C_m$. This value $\delta C_m$ indicates the amount by which the C model pressure $C_m$ must be increased per time cycle. Correspondingly the value $\delta C_m$ and $C_m$ (old) are fed to a subtractor 56, whose output signal is the new value of $C_m$. Since the model pressures $C_m$ and $R_m$ are coupled together by way of a constant factor, the value $\delta C_m$ is also by this factor proportional to the drop in the model pressure $R_m$ that occurs per time cycle. Therefore, the output of the circuit 55 is connected to a multiplier 57, which multiplies the value $\delta C_m$ by this constant factor, from which then a $\delta R_m$ is obtained, i.e. a value that indicates the amount by which the model pressure $R_m$ has to be reduced per time cycle. The output signal of the multiplier 57 is, therefore, subtracted in a subtractor 58 from the preceding value of the R model pressure $R_m$(old), in order to form the new value $R_m$ (new).

The minimum selection circuit 53 ensures the result that the model pressure $C_m$ cannot be greater than the supply container pressure $R_m$. The remaining circuits of FIG. 8a that are not mentioned here in detail correspond to those of FIG. 8.

Figure 9:
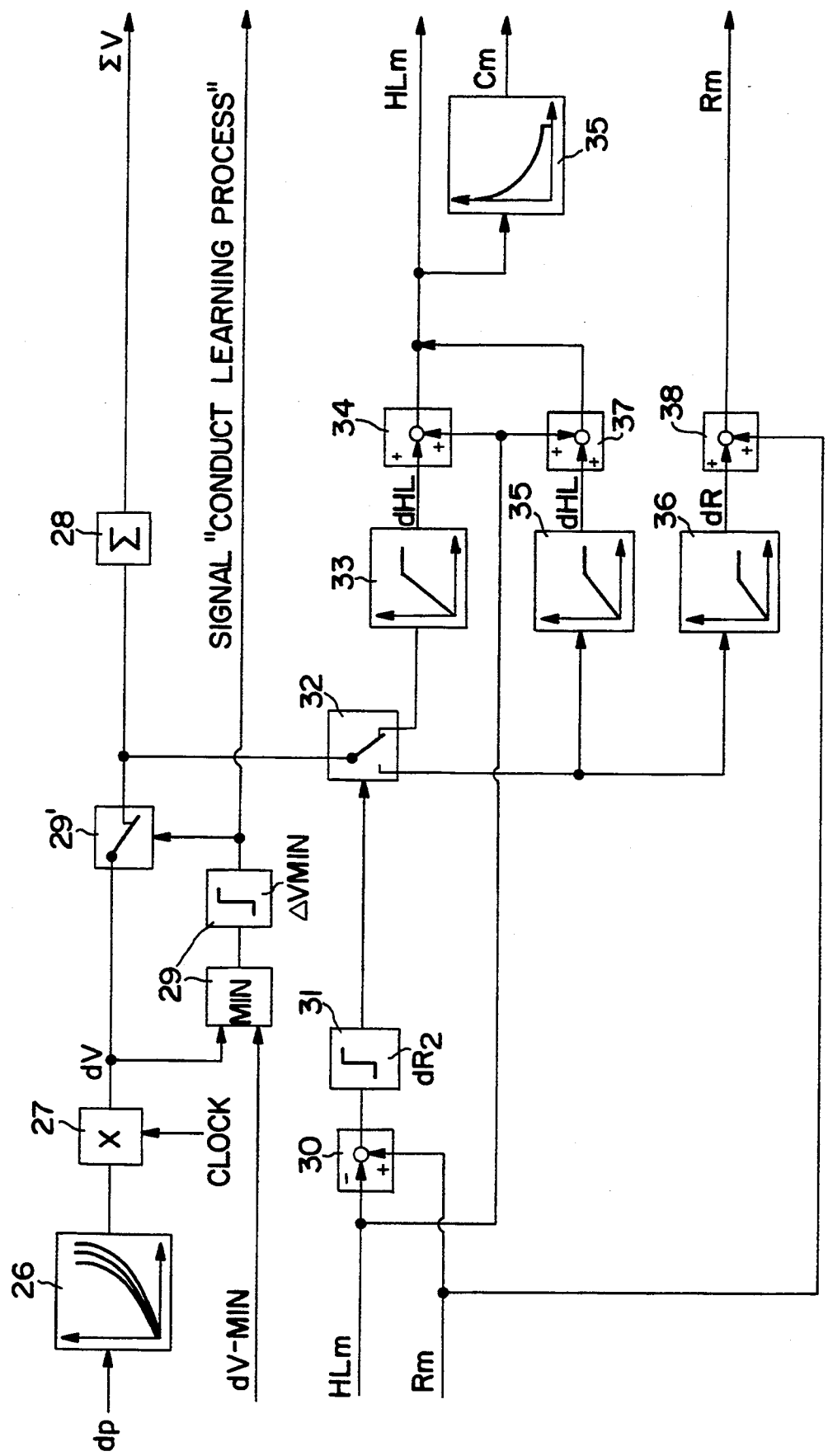
FIG. 9 is another block diagram in order to explain the simulation of other pressure changes.

In FIG. 9 block 16 of FIG. 6 is shown in detail. Through inquiry of a memory 26, which contains calibration curves for the pressure sensors and optionally various backfeed pressures (HB pressures), a value of the flow rate of the air backfed during the brake releasing process is determined from the measured value dp. A value of the volume dV backfed per time cycle is formed from this value while controlling the time cycle in block 27. In a digital integrator 28 the values of dV are added up, from which the value $\Sigma V$ is obtained that denotes the volume of air actually backfed since the start of the brake releasing process.

The value dV is compared with a threshold dV-min in a comparator 29. If dV exceeds this threshold for a specific duration, the brake releasing process is regarded as terminated, since the then backfed volume is so small that it does not lead to any effective pressure increase in HL pressure. The output signal of the comparator 29 opens then a switch 29, with which the adder 28 is ineffectively switched. Furthermore, this output signal is passed to the block "learning process", which is then started following a completed brake releasing process.

To distinguish whether the instantaneously backfed volume serves only to fill the HL or to jointly fill the HL and R containers, a check is made whether UREF is greater than $R_m$ and whether $HL_m$ is still below the value $R_m$ existing at the end of the braking process. The latter can occur, for example, in that the difference $R_m - HL_m$ is formed by a subtractor 30 and is compared with the reference value $dR_2$ (e.g. 30 mbar) in a limit switch 31. If $HL_m$ is still below $R_m$, a change-over switch 32 is driven in such a manner that dV is used only to increase the model pressure $HL_m$. The increments dV are then multiplied by a factor and added up in a block 33. This factor corresponds to the gradient for the increase of $HL_m$ and depends on the number of HL blocks AHL. At the output of block 33 there appears then a signal, which represents the targeted pressure increase dHL. This value is added to the existing model pressure $HL_m$ in an adder 34, from which then the model pressure $HL_m$, rising during the brake releasing process, is obtained. The C pressure decrease according to a time function is determined from this value in a block 35. This time function is theoretically an e function, which is approximated here by four straight segments.

If the check in the subtractor 30 and comparator 31 shows that the pressure $HL_m$ has reached the pressure $R_m$ (and $U_{REF} > R_m$), this means that the backfed volume dV is now used to fill HL and the R containers. Then the HL pressure is increased with a flatter gradient, since the larger portion of the backfed air is used to increase the R pressure. The switch 32 changes over so that the increments dV are fed to two blocks 35 and 36 to increase more slowly the HL and R pressures. The gradients for this increase are determined in block 35 by the number of HL blocks AHL and in block 36 by the number of R blocks AR. The increments, determined thus with these gradients, for the HL and R pressure increase dHL and dR are added to the values of $HL_m$ and $R_m$, determined during the last time cycle, analogously to the adder 34 in adders 37 or 38, from which the current value $HL_m$ and $R_m$ are then obtained.

Figure 10:
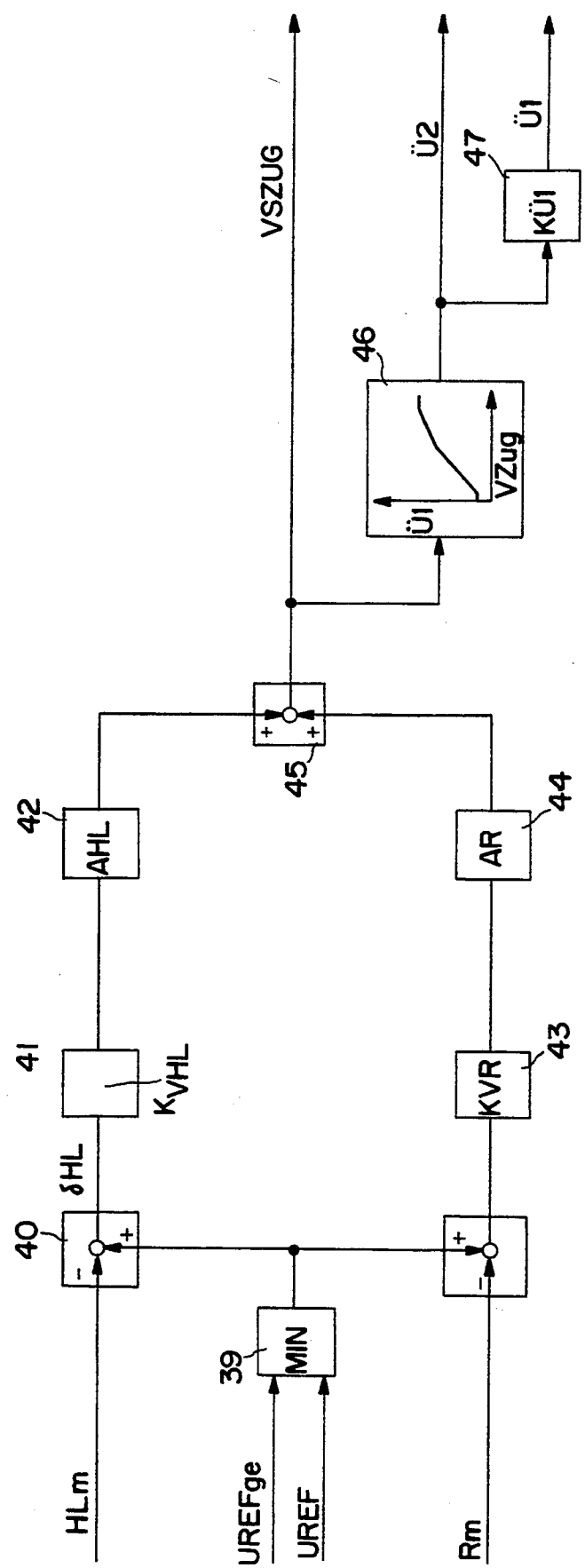
FIG. 10 is a detailed block diagram of those parts of the brake control that determine the overpressure value of the pilot control pressure during the brake releasing process.

According to the block diagram of FIG. 10, the values for VSZUG, Ü1 and Ü2 are then determined from these two values. The values UREF and UREFge serve as other input variables. The minimum of these two values is determined in a minimum selection 39 and fed to a subtractor 40, where the value $HL_m$ is subtracted. The resulting differential value δHL is multiplied by a constant factor in a multiplier 41 and by the current number of HL blocks in another multiplier. In a similar manner the difference is formed from the minimum of UREFge and UREF minus $R_m$ and multiplied by a constant factor or the number of R blocks AR in multipliers 43 and 44. The factor of the multiplier 43 can be specified at random. However, the learning process has more advantageous start conditions if this factor approximates the volume ratio between the volume of the R containers of a block and the volume of the HL pipe of a block. In the case of conventional freight trains, this ratio is about 1:8; in the case of modern passenger coaches where the HB pipe (backfeed pipe) is looped through the train and the R containers are filled directly from the HB pipe, the number of AR—as seen from the HL—is equal to zero, since the volume of air to be backfed to the R containers by way of the HL is equal to zero. The output values of the multipliers 42 and 44 are added to an adder 45, resulting then in the value VSZUG for the volume still to be backfed. A value for Ü2 is then formed from this value in a block 46 in accordance with a specified characteristic. Since the values Ü1 and Ü2 are here in a fixed ratio to each other (e.g. factor 5), the value Ü1 is formed from Ü2 in a multiplier 47. The actual overage value "ÜBER", by which the pilot control pressure is additionally to be raised in order to release the brake faster, is formed from these two values in block 6 of FIG. 4.

Figure 11:
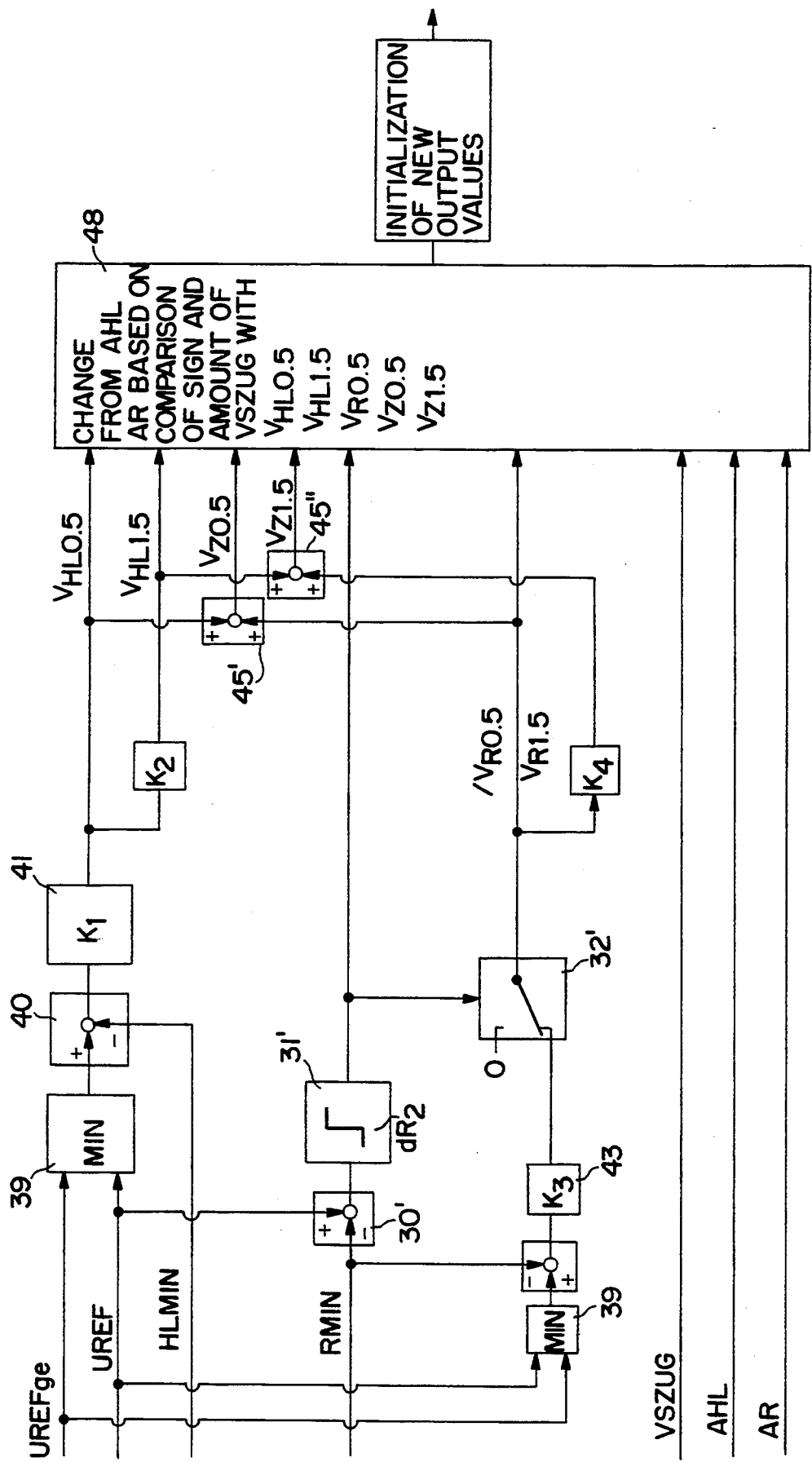
FIG. 11 is a block diagram of those parts of the brake control that perform the adaptive learning process.

FIG. 11 shows a block diagram for the learning process. During the learning process the air requirement for 0.5 and 1.5 HL blocks, 0.5 and 1.5 R blocks and for 0.5 and 1.5 train blocks (comprising HL and R blocks) is subsequently computed starting from the preceding brake releasing process in order to form VSZUG according to FIG. 10. In so doing, VSZUG can be positive or negative. In concrete cases, at variance with the block diagram of FIG. 10, the values HL-min and R-min are used as the input variables, from which then, analogously to the outputs of the multipliers 42 and. 44 of FIG. 10, increments of backfed quantities of air for HL and/or R blocks are determined for ± a half or one and one-half block lengths. The following values are obtained:

$V_{HL0.5}$, which corresponds to the required volume to fill a half HL block;

$V_{HL1.5}$, corresponding to this quantity of air for one and one-half HL blocks;

$V_{R0.5}$, corresponding to the volume still to be backfed for the R containers at one half; and $V_{R1.5}$, corresponding to this volume at one and one-half R blocks. In the adders 45' and 45'', whose function matches the adder 45 of FIG. 10, the corrected values are then formed for VSZUG for the correspondingly modified block numbers.

According to FIG. 9, a check is made here, too, as to whether the volume to be backfed serves to fill HL alone or HL and the R containers. To this end, the variables UREF and R-min are compared (cf. subtractor 30' and limit switch 31'). If this comparison shows that only HL is filled, the output of the comparator 31' drives a switch 32', whose function corresponds to the switch 32 in FIG. 9. If the comparison determines that only HL is filled, the switch is moved into the zero position, so that no volumes to be backfed are computed for the R containers.

From the determined variables the actual learning process is effected in a computing block 48, where the block numbers AHL and/or AR are compared with the values modified by the modified block numbers on the basis of the comparison of the sign and amount of VSZUG. Following the completion of the learning process in block 48, the optionally modified block numbers AHL and AR for the next cycle are emitted as new output values.

Figure 12A:
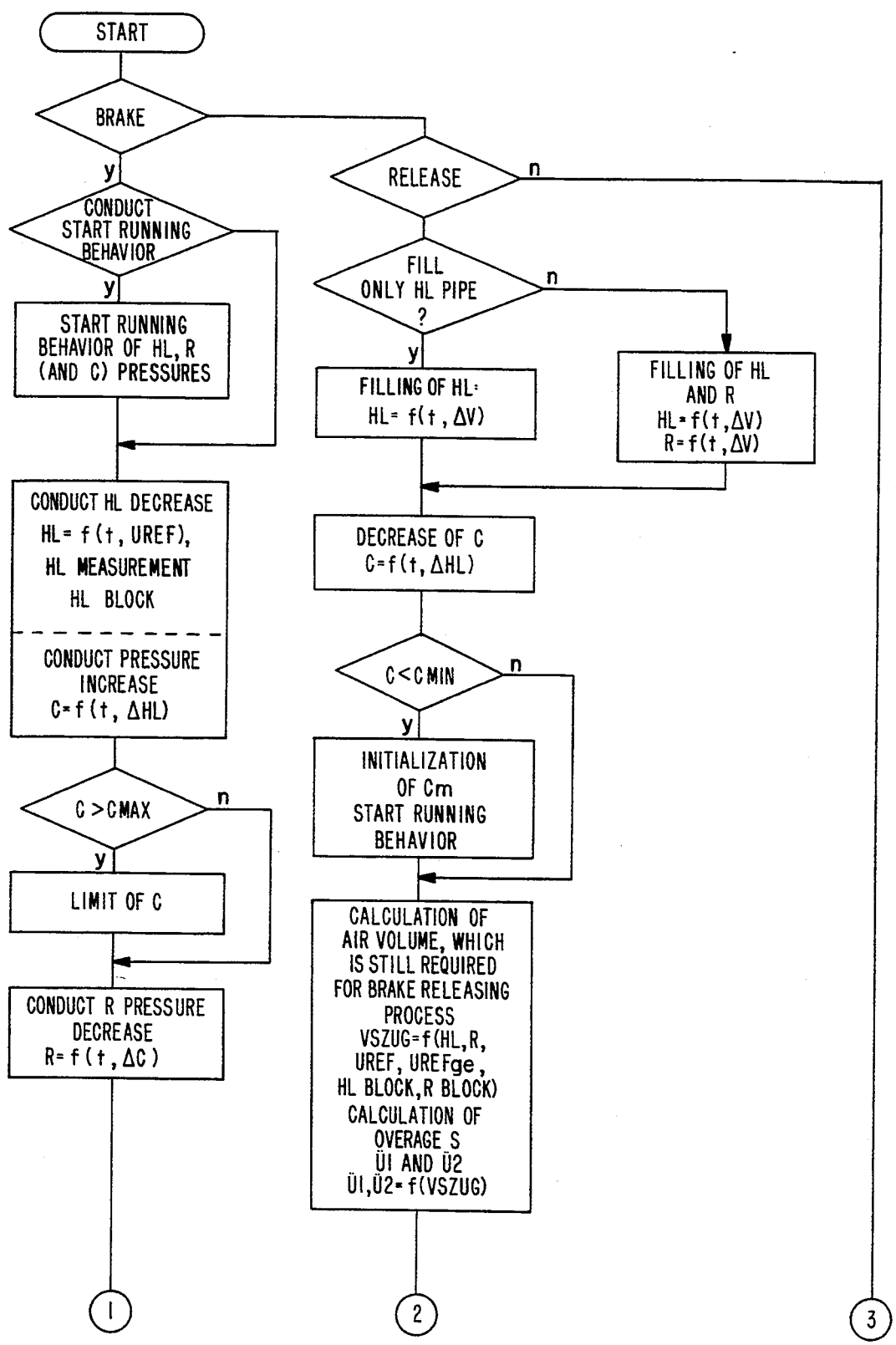
FIGS. 12a and 12b are detailed flow diagrams in order to explain how the train model works.
Figure 12B:
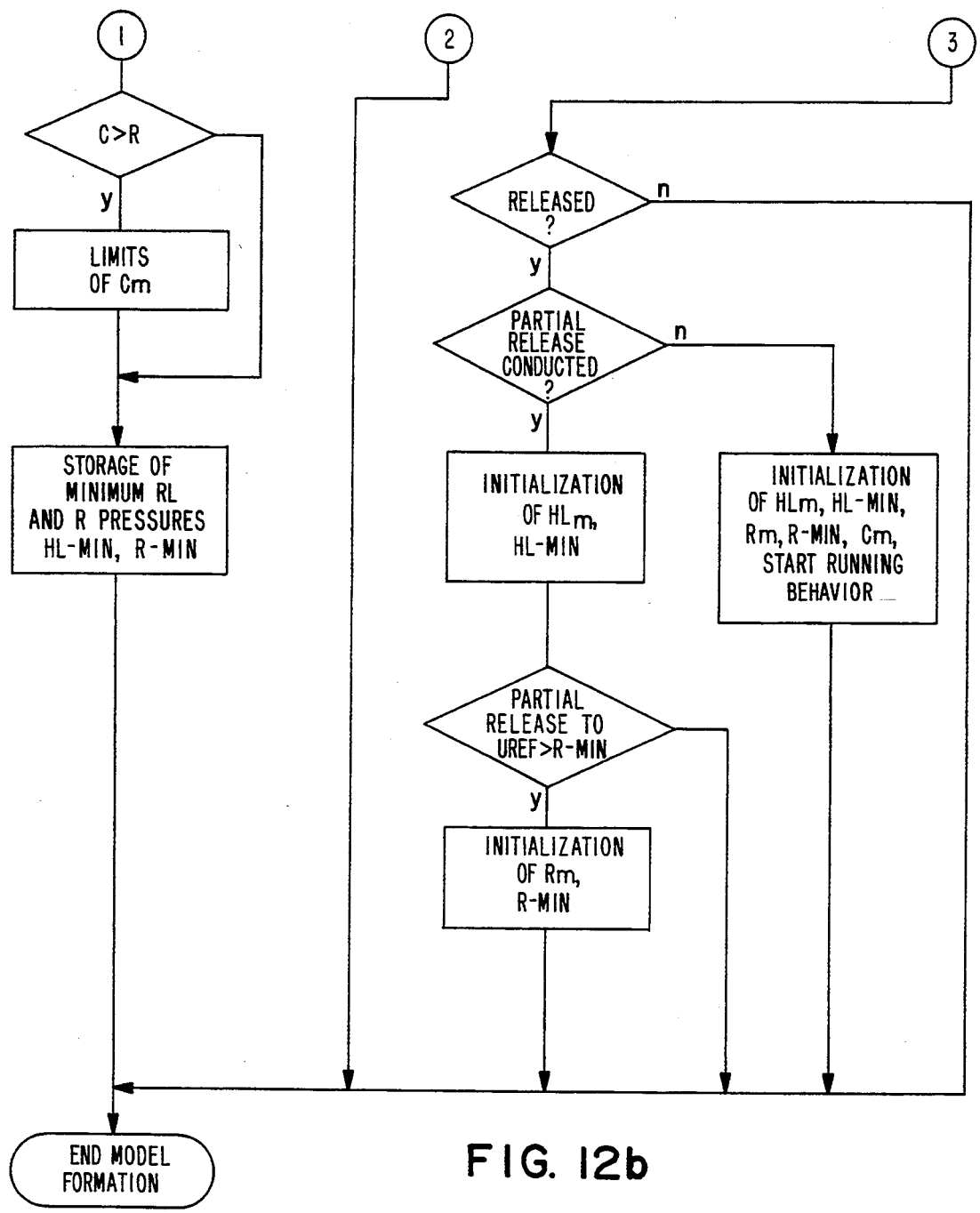
Figure 13:
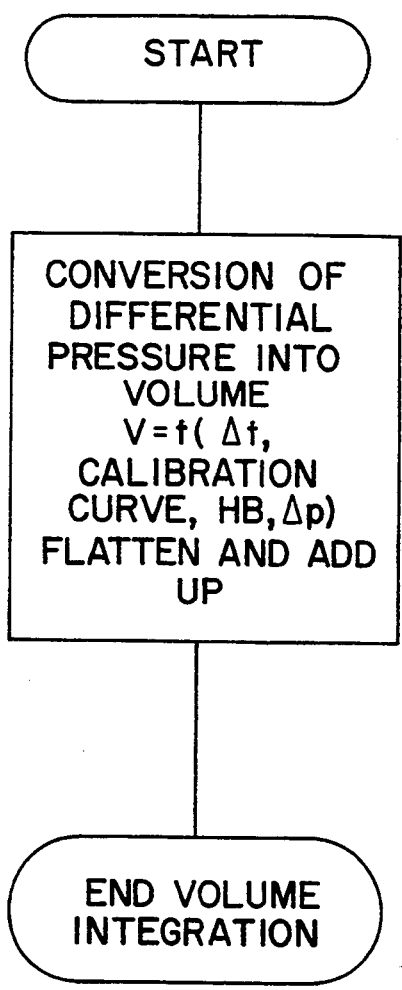
FIG. 13 is a flow diagram in order to explain the volume integration effected by the train model.
Figure 14A:
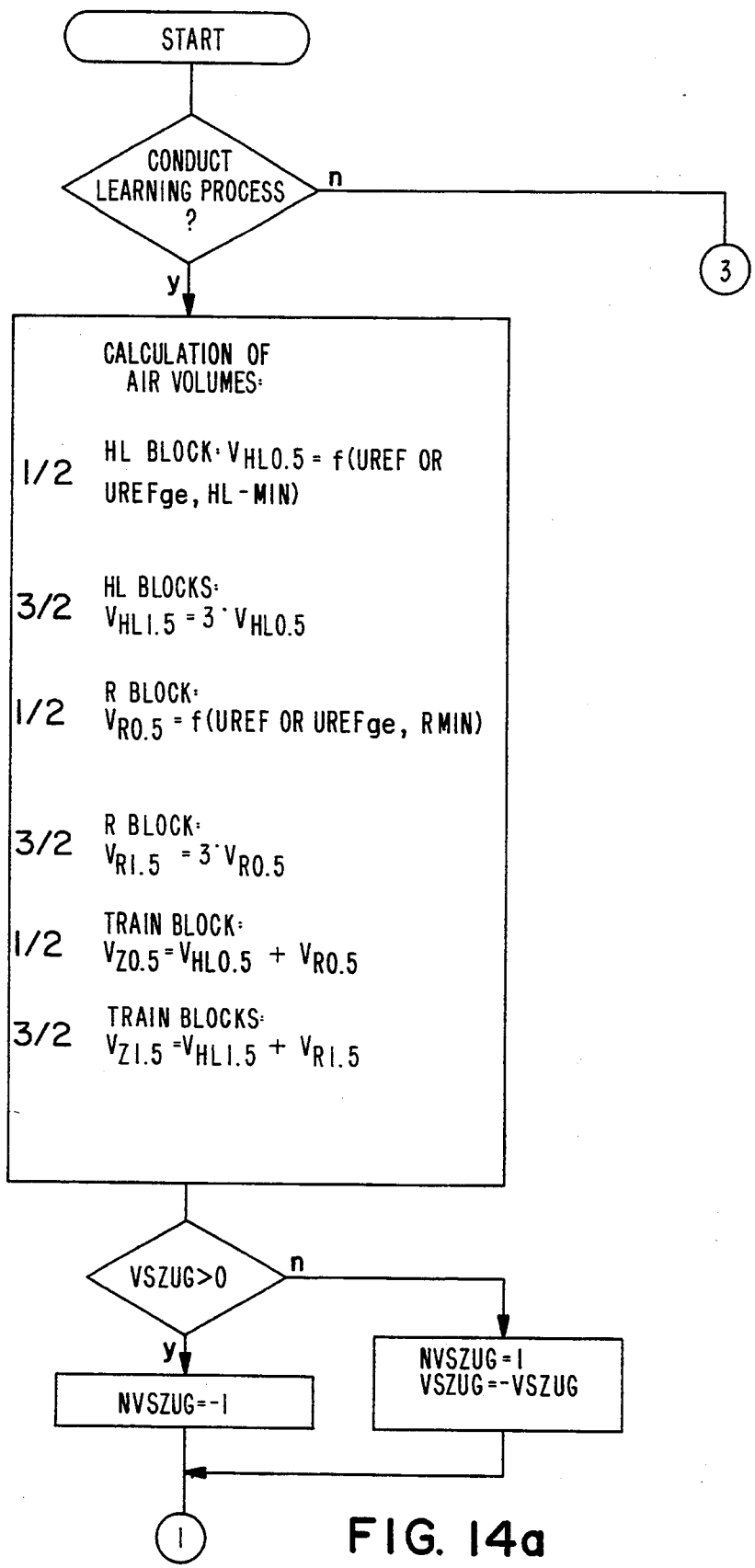
FIGS. 14a, 14b and 14c are detailed flow diagrams in order to explain the adaptive learning process.
Figure 14B:
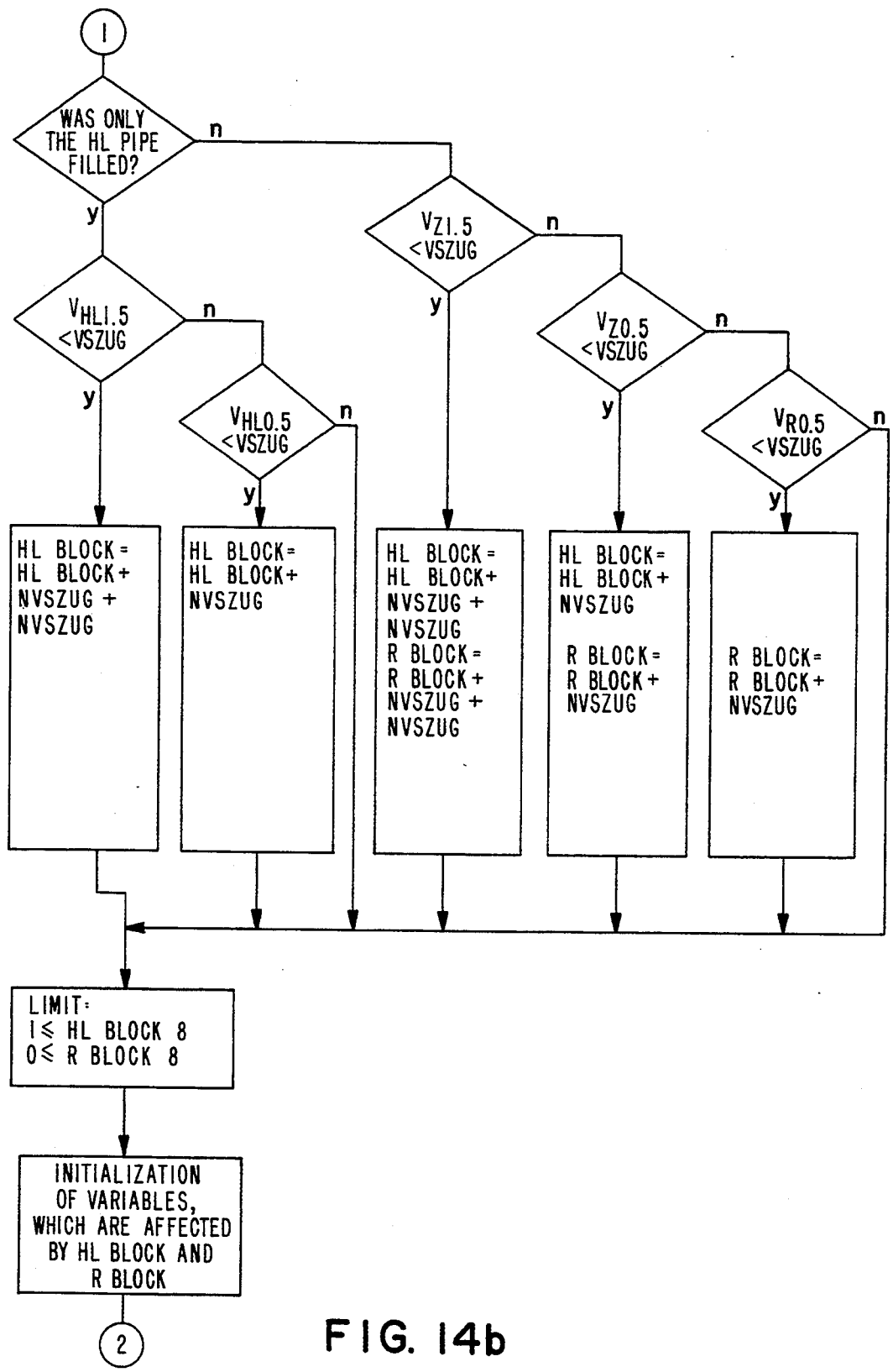
Figure 14C:
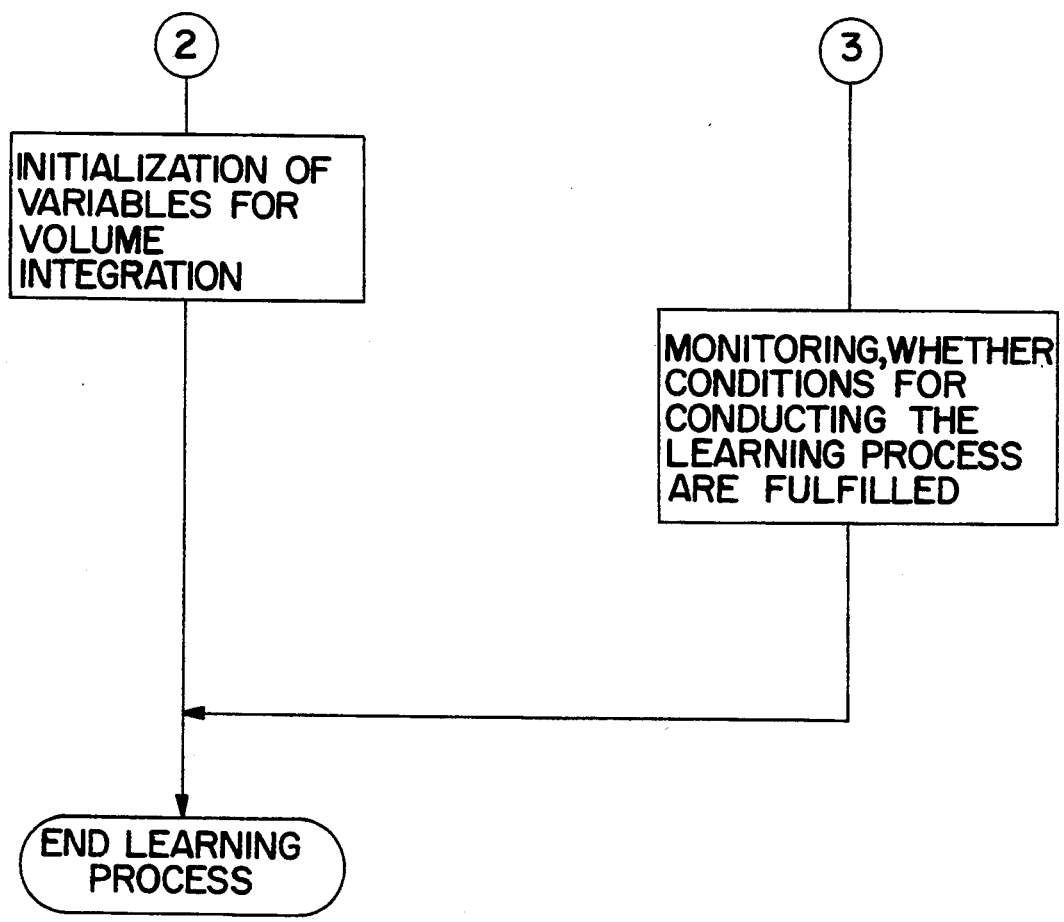
Figure 15:
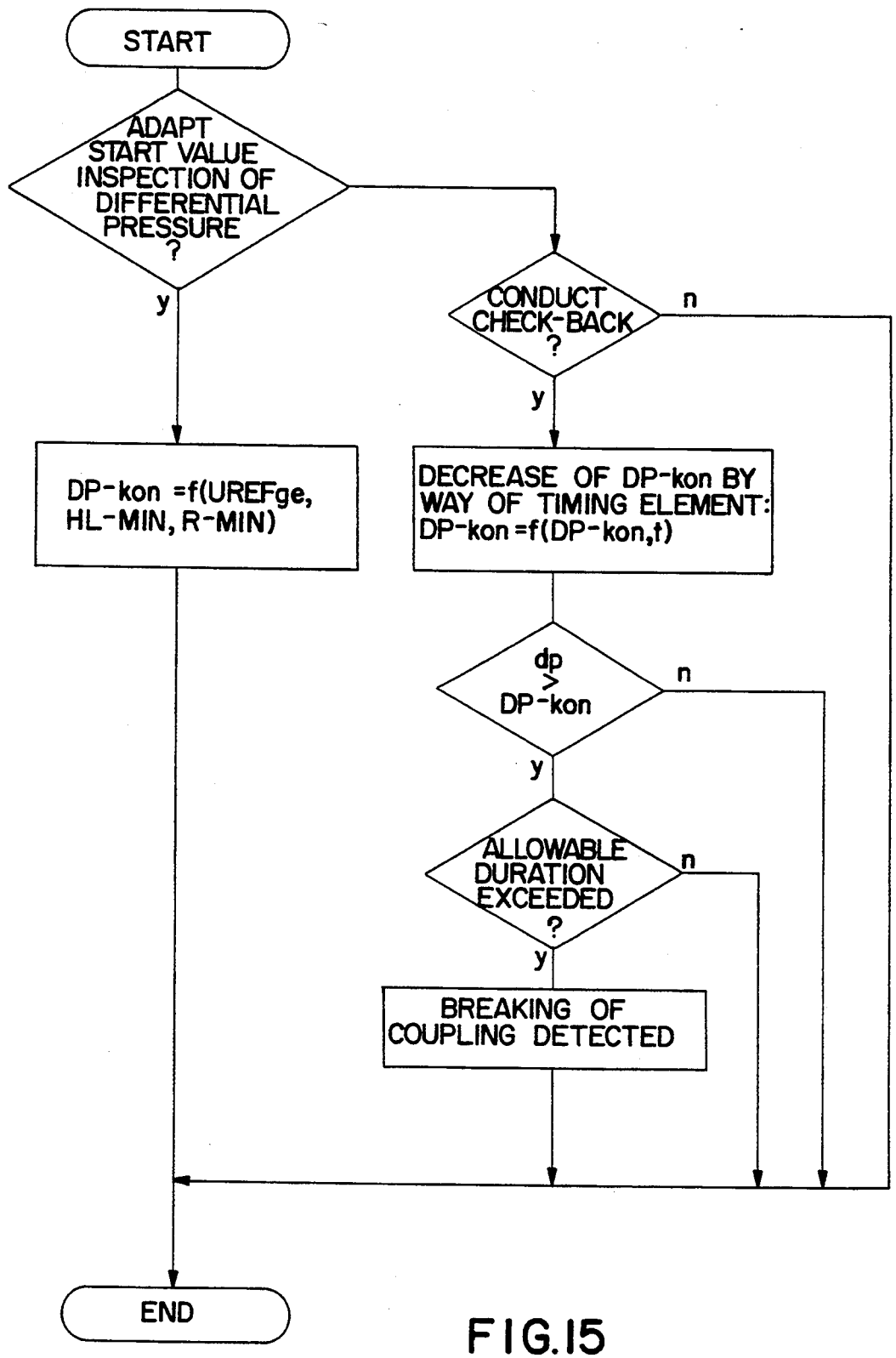
FIG. 15 is a flow diagram to explain the operational mode of the brake control when it detects the breaking of a coupling.

FIG. 12 is once again a detailed flow diagram of how the train model function in order to simulate the different pressures. Like the other flow diagrams, this figure is to show clearly the sequence of operations described above. FIG. 13 shows correspondingly the volume integration. FIG. 14 shows the earning process. FIG. 15 shows finally the monitoring of the breaking of coupling.

What is claimed is:

1. A process for operating a compressed air brake having an electropneumatic brake valve with an actuator to adjust a setpoint (UREF) for the brake pressure, a relay valve attached to a main air pipe (HL), operated by a pilot control pressure from said brake valve, at least two air supply containers attached to the main air pipe (HL), and a first and a second sensor for measuring the volume of air fed into the main pipe and for measuring the air pressure in the main pipe, comprising the following steps:

(a) measuring the volume of the air (ΣV) fed into the main air pipe (HL) when releasing the brake and generating a first air volume signal in response thereto;

(b) measuring the air pressure (HList) in the main air pipe (HL) and generating a main air pipe air pressure signal in response thereto;

(c) modifying the pilot control pressure (A-pressure) in response to the first air volume signal and the main air pipe air pressure signal;

(d) generating electric simulation signals, which simulate the change in pressure over time of at least the main air pipe pressure ($HL_m$) and a pressure ($R_m$) in said air supply containers on the basis of a predetermined function of said first air volume signal and said main air pipe air pressure signal (HList);

(e) generating an electric air backfeed signal (VSZUG), which corresponds to the volume of air still to be backfed during a brake releasing process on the basis of said electric simulation signals representing a change in main air pipe pressure and air supply container pressures ($HL_m$ and $R_m$), of a reference signal (UREF) derived from the actuator and of stored value signals (AHL, AR), which correspond to an assumed volume of air in the main air pipe and the air supply container;

(f) generating a correction value signal (ÜBER), which determines an amount by which the pilot control pressure set to release the brake is to be increased, on the basis of the electric backfeed signal (VSZUG);

(g) comparing said first air volume signal and said electric air backfeed signal; and, (h) correcting said stored value signals (AHL, AR) if said first air volume signal and electric air backfeed signal are not the same.

2. Process for adaptive brake control, as claimed in claim 1, further comprising following the decrease in the overpressure (from Ü1 to Ü2), generating a check-back pressure (dP-kon), and comparing the check-back pressure with a pressure (dp) in a backfeed branch for the main pipe line (HL), and generating an alarm signal when the check-back pressure (dP-kon) for a specified duration is less than the measured pressure (dp).

3. Process for adaptive brake control, as claimed in claim 1, further comprising linearly reducing in time the signal representing the pressure change of the main air pipe pressure ($HL_m$) along a slope depends on the stored value signal (AHL) which is selected so the simulated pressure drop ($HL_m$) at the start of a braking process has less of a slope than the actual pressure drop it represents (HL-actual), and the simulated pressure drop ($HL_m$) is established as the maximum value of the actual pressure change and the pressure change dropping linearly in time.

4. Process for adaptive brake control, as claimed in claim 3, further comprising storing the minimum value (HL-min) of the simulated pressure change ($HL_m$) that is obtained during a braking process is stored.

5. Process for adaptive brake control, as claimed in claim 4, wherein to determine the simulated pressure ($R_m$) in the air supply containers, a value (UREFge) of the braking demand signal that is stored at the start of the braking process minus the simulated (HL) pressure drop ($HL_m$) is compared with a stored value, which corresponds to the maximum possible pressure (C-max) in individual brake cylinders of the brake system, increasing the smaller of these two compared values (C-desired) along a specified time gradient, and at each increase, decreasing the simulated air supply container pressure ($R_m$) by a second specified amount.

6. Process for adaptive brake control, as claimed in claim 5, wherein the minimum value (R-min) of the simulated air supply container pressure ($R_m$) is stored in a memory.

7. Process for adaptive brake control, as claimed in claim 3, further comprising determining during a brake releasing process the volume of air actually backfed into the main air pipe by measuring the differential pressure (dp) at a flow restrictor, and comparing said differential pressure (dp) with a calibration curve, and comparing the volume of air (dV) backfed into the main air pipe per unit of time with a spedfled minimum value (dV-min), and adding the volumes of air (dV) backfed per unit of time as a function of said comparison of said volumes of air.

8. Process for adaptive brake control, as claimed in claim 7, wherein during a brake releasing process determining whether the demanded brake pressure (UREF) and the simulated main air pipe pressure ($HL_m$) is less than the simulated air supply container pressure ($R_m$), and weighting the volume of air (dV) backfed per unit of time with a value which corresponds to the stored value (AHL) for the assumed air volume of the main air pipe when the simulated main air pipe pressure ($HL_m$) is less than the simulated air supply container pressure ($R_m$), which increments (dHL) for the increase in the simulated main air pipe pressure per unit of time are determined, and wherein, when the simulated main air pipe pressure ($HL_m$) is less than the simulated air supply container pressure ($R_m$), weighting the values of the volume of air (dV) backflowing per unit of time with two weighting factors (AHL, AR), whose total sum corresponds to the assumed volume of the main air pipe and the air supply containers, and determining incremental values for the joint pressure increase of the main air pipe pressure and of the air supply container pressure from said volume of air (dV) backflowing per unit of time.

9. Process for adaptive brake control, as claimed in claim 1, further comprising during a brake releasing process, subtracting the current value of the simulated main air pipe pressure ($HL_m$) from the smaller value of a current brake demand signal (UREF) and a brake demand signal (UREFge) stored at the start of the braking process, and multiplying a resulting difference by a first constant factor corresponding to the stored value (AHL) for the assumed volume of the main air pipe, and subtracting the minimum brake demand signal and the difference from the simulated air supply container pressure ($R_m$) and multiplying the result by a constant factor and a factor which corresponds to the assumed volume of the air supply containers (AR), and adding the two resulting products to form a value (VSZUG), which represents the volume of air still to be backfed.

10. Process for adaptive brake control, as claimed in claim 9, wherein two limits (Ü1 and Ü2) of overpressure during a brake releasing process are determined from the value (VSZUG) for the volume of air still to be backfed.

11. Process for adaptive brake control, as claimed in claim 10, further comprising increasing the overpressure to be added to the pilot control pressure during the releasing process, linearly in time at a first gradient to the first limit (Ü1), and maintaining said overpressure for a specified duration (tü), and subsequently decreasing said overpressure at a second gradient linearly in time to the second limit (Ü2), and then decreasing said overpressure at a third gradient to the zero value, the third gradient being so small that the brake control valves of the individual wagons do not respond to the subsequent drop in pressure.

12. Process for adaptive brake control, as claimed in claim 11, further comprising determining the specified duration (tü) is determined as a function of the actuation (brake step and duration of the brake step) of the brake actuator.

13. Process for adaptive brake control, as claimed in claim 1, further comprising following a completed brake releasing process, checking whether the difference between the actually backfed volume of air and a determined volume of air (VSZUG) still to be backfed is equal to zero, and when this condition is not fulfilled, values ($V_{HL0.5}$, $V_{HL1.5}$, $V_{R0.5}$, $V_{R1.5}$, $V_{ZUG0.5}$, $V_{ZUG1.5}$) which are corrected as a function of the sign of said difference, are determined to specify a quantity of air to obtain the set pressure (UREF) the corrected values are compared with the value (VSZUG) for the volume of air still to be backfed, and modifying the stored values (AHL and/or AR) based on the comparison of the value of the determined volume of air still to be backfed with the corrected values for the next braking and brake releasing cycle.

14. Process for adaptive brake control, as claimed in claim 13, further comprising generating an alarm signal when modifications of at least one of the assumed volumes of the main air pipe and air supply containers exceed a specified value.

15. Adaptive air brake control apparatus comprising an electropneumatic brake valve with an actuator to adjust a brake pressure setpoint, including:
- a main air pipe;
- a relay valve attached thereto;
- at least two air supply containers attached to said main air pipe;
- a first sensor for measuring the air volume fed into said main air pipe when releasing the brake; and,
- a second sensor for measuring the air pressure in said main air pipe, said electropneumatic brake valve producing a pilot control pressure for controlling said relay valve and said air brake control apparatus modifying said pilot control pressure in response to output signals of both of said sensors;

further comprising:
  (a) electronic train simulation means generating electrical signals which simulate the change in pressure over time of at least the main air pipe pressure and the pressure in the air supply containers on the basis of a predetermined function of the output signals of the sensors;
  (b) memory means storing values which correspond to an assumed volume of air in the main air pipe and the volume of air in said air supply containers;
  (c) calculating means which generate a signal which corresponds to the volume of air to be backfed during a brake release process on the basis of the electric simulation signals and said values stored in said memory means;
  (d) correction means which determines an amount signal by which the pilot control pressure to release the brake is to be increased on the basis of the signal from said calculating means;
  (e) comparison means which following a brake release compares the value of the measured backfed volume and the value of the said volume of air to be backfed; and,
  (f) learning means which, in dependence on an output signal from said comparing means, modifies the stored values in said memory means

* * * * *